(12) United States Patent
Jee et al.

(10) Patent No.: US 11,269,448 B2
(45) Date of Patent: Mar. 8, 2022

(54) TOUCH SENSOR, DISPLAY DEVICE, AND METHOD OF DRIVING A TOUCH SENSOR

(71) Applicant: Samsung Display Co., Ltd., Yongin-Si (KR)

(72) Inventors: Yong Jin Jee, Seongnam-si (KR); Gwang-Bum Ko, Yongin-si (KR); Sang Hun Park, Cheonan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/987,323

(22) Filed: Aug. 6, 2020

(65) Prior Publication Data

US 2021/0181917 A1 Jun. 17, 2021

(30) Foreign Application Priority Data

Dec. 13, 2019 (KR) .......................... 10-2019-0166361

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0443* (2019.05); *G06F 3/0446* (2019.05)

(58) Field of Classification Search
CPC ......................................... G06F 3/041–04886
See application file for complete search history.

(56) References Cited

U.S. PATENT DOCUMENTS

| 9,535,523 | B2* | 1/2017 | Kim | G02F 1/13338 |
| 10,078,404 | B2* | 9/2018 | Hong | G06F 3/044 |
| 10,969,909 | B2* | 4/2021 | Hong | G06F 3/04164 |
| 2010/0144391 | A1* | 6/2010 | Chang | G06F 3/04166 455/566 |
| 2010/0149108 | A1* | 6/2010 | Hotelling | G06F 3/04164 345/173 |
| 2013/0181943 | A1* | 7/2013 | Bulea | G06F 3/041 345/174 |

(Continued)

FOREIGN PATENT DOCUMENTS

| KR | 10-2017-0134836 A | 12/2017 |
| KR | 10-2017-0136072 A | 12/2017 |

(Continued)

*Primary Examiner* — Amy Onyekaba
(74) *Attorney, Agent, or Firm* — Innovation Counsel LLP

(57) ABSTRACT

A touch sensor includes a plurality of touch driving electrodes arranged in each of a plurality of touch driving columns in a column direction, and a plurality of touch sensing electrodes arranged in each of a plurality of touch sensing columns in the column direction, the plurality of touch driving columns and the plurality of touch sensing columns being alternately arranged in a row direction. In each of the plurality of touch driving columns, two or more odd-numbered touch driving electrodes among the plurality of touch driving electrodes are substantially simultaneously driven during a first touch group driving period. In each of the plurality of touch driving columns, two or more even-numbered touch driving electrodes among the plurality of touch driving electrodes are substantially simultaneously driven during a second touch group driving period that is different from the first touch group driving period.

20 Claims, 12 Drawing Sheets

(56) References Cited

U.S. PATENT DOCUMENTS

| | | | |
|---|---|---|---|
| 2013/0307793 A1* | 11/2013 | Song | G06F 3/0448 345/173 |
| 2014/0111707 A1* | 4/2014 | Song | G06F 3/04164 349/12 |
| 2014/0327644 A1* | 11/2014 | Mohindra | G06F 3/04182 345/174 |
| 2014/0333847 A1* | 11/2014 | Yu | G06F 3/0443 349/12 |
| 2014/0368750 A1* | 12/2014 | Liao | G06F 3/0443 349/12 |
| 2015/0077387 A1* | 3/2015 | Han | G06F 3/0443 345/174 |
| 2015/0179122 A1* | 6/2015 | Brown | G06F 3/0446 345/174 |
| 2015/0185938 A1* | 7/2015 | Han | G06F 3/0445 345/173 |
| 2015/0205428 A1* | 7/2015 | Wang | G06F 3/0412 345/174 |
| 2015/0370380 A1* | 12/2015 | Hong | G06F 3/0443 345/174 |
| 2016/0026290 A1* | 1/2016 | Liu | G06F 3/047 345/174 |
| 2016/0202829 A1* | 7/2016 | Choi | G06F 3/04184 345/174 |
| 2016/0253013 A1* | 9/2016 | Yang | G02F 1/133528 345/173 |
| 2016/0282981 A1* | 9/2016 | Ding | G06F 3/0446 |
| 2016/0282995 A1* | 9/2016 | Lee | G06F 3/0443 |
| 2017/0046003 A1* | 2/2017 | Huang | G06F 3/0443 |
| 2017/0115802 A1* | 4/2017 | Sun | G06F 3/04166 |
| 2017/0147127 A1* | 5/2017 | Sun | G06F 3/04164 |
| 2017/0168635 A1* | 6/2017 | Xiang | G09G 3/2096 |
| 2017/0177158 A1* | 6/2017 | Tu | G06F 3/04184 |
| 2017/0285823 A1* | 10/2017 | Pan | G02F 1/13452 |
| 2017/0285837 A1* | 10/2017 | Zeng | G06F 1/1643 |
| 2017/0336910 A1* | 11/2017 | Han | G06F 3/041661 |
| 2018/0046276 A1* | 2/2018 | Hou | G06F 3/0443 |
| 2018/0107379 A1* | 4/2018 | Jia | G06F 3/04166 |
| 2018/0113346 A1* | 4/2018 | Han | G06K 9/001 |
| 2019/0179475 A1* | 6/2019 | Seo | G06F 3/0383 |
| 2019/0204949 A1* | 7/2019 | Zhao | G06F 3/0446 |
| 2019/0235678 A1* | 8/2019 | Kim | G06F 3/0445 |
| 2020/0201478 A1 | 6/2020 | Ko et al. | |
| 2020/0210025 A1* | 7/2020 | Kim | G06F 3/0443 |
| 2020/0241703 A1* | 7/2020 | Liang | H01L 27/124 |
| 2020/0272329 A1* | 8/2020 | Tang | G06F 3/041662 |

FOREIGN PATENT DOCUMENTS

| | | |
|---|---|---|
| KR | 10-2019-0010762 A | 1/2019 |
| KR | 10-2019-0093236 A | 8/2019 |

* cited by examiner

|  | TGDP1 | | | |
|---|---|---|---|---|
|  | SP1 | SP2 | SP3 | SP4 |
| TXS1 | 1 | 1 | 1 | -1 |
| TXS3 | 1 | 1 | -1 | 1 |
| TXS5 | 1 | -1 | 1 | 1 |
| TXS7 | -1 | 1 | 1 | 1 |

FIG. 8

|  | TGDP1 | | | |
|---|---|---|---|---|
|  | SP1 | SP2 | SP3 | SP4 |
| TXS1 | −1 | −1 | −1 | 1 |
| TXS3 | −1 | −1 | 1 | −1 |
| TXS5 | −1 | 1 | −1 | −1 |
| TXS7 | 1 | −1 | −1 | −1 |

400

TOUCH SENSOR, DISPLAY DEVICE, AND METHOD OF DRIVING A TOUCH SENSOR

CROSS-REFERENCE TO RELATED APPLICATION(S)

This application claims priority under 35 USC § 119 to Korean Patent Application No. 10-2019-0166361, filed on Dec. 13, 2019 in the Korean Intellectual Property Office (KIPO), the disclosure of which is incorporated herein by reference in its entirety.

BACKGROUND

1. Field

The present disclosure relates to a display device, and more particularly to a touch sensor, a display device including the touch sensor, and a method of driving the touch sensor.

2. Description of the Related Art

Touch sensors or touch screens are widely used in electronic devices to detect an input action or an event by a user. Typically, a touch sensor detects the presence and location of a user's touch by generating an electrical signal when the touch sensor is touched by a finger, a stylus pen, etc. The touch sensor may be mounted on a display panel, such as an organic light emitting diode (OLED) display panel, a liquid crystal display (LCD) panel, etc., or may be formed within the display panel. The touch sensor may be classified into a resistive touch sensor, a capacitive touch sensor, an electromagnetic touch sensor, an infrared touch sensor, a surface acoustic wave (SAW) touch sensor, a near field imaging (NFI) touch sensor, etc. Among these various types of touch sensors, the capacitive touch sensor has been most widely used because of its rapid response speed and thin profile.

Recently, efforts have been made to further reduce the thickness or the number of layers of the capacitive touch sensor, and a one-layer (1-L) touch sensor in which touch driving electrodes and touch sensing electrodes are formed in a single layer has been developed. However, in a 1-L touch sensor, power consumption and a noise of the touch sensor may be increased due to an undesired parasitic capacitance that may be formed between signal lines and/or touch electrodes.

SUMMARY

Some example embodiments provide a touch sensor capable of reducing power consumption and a noise.

Some example embodiments provide a display device including a touch sensor capable of reducing power consumption and a noise.

Some example embodiments provide a method of driving a touch sensor capable of reducing power consumption and a noise.

According to an example embodiment, a touch sensor includes a plurality of touch driving electrodes arranged in each of a plurality of touch driving columns in a column direction, and a plurality of touch sensing electrodes arranged in each of a plurality of touch sensing columns in the column direction, the plurality of touch driving columns and the plurality of touch sensing columns being alternately arranged in a row direction. In each of the plurality of touch driving columns, two or more odd-numbered touch driving electrodes among the plurality of touch driving electrodes are substantially simultaneously driven during a first touch group driving period. In each of the plurality of touch driving columns, two or more even-numbered touch driving electrodes among the plurality of touch driving electrodes are substantially simultaneously driven during a second touch group driving period that is different from the first touch group driving period.

In example embodiments, the touch sensor may further include a plurality of touch driving lines extending substantially in the column direction and respectively connected to the plurality of touch driving electrodes in each of the plurality of touch driving columns. In each of the plurality of touch driving columns, odd-numbered touch driving lines among the plurality of touch driving lines may be connected to the odd-numbered touch driving electrodes at a first side of the plurality of touch driving electrodes. In each of the plurality of touch driving columns, even-numbered touch driving lines among the plurality of touch driving lines may be connected to the even-numbered touch driving electrodes at a second side that is opposite to the first side of the plurality of touch driving electrodes.

In example embodiments, touch driving signals may be substantially simultaneously applied to the odd-numbered touch driving electrodes through the odd-numbered touch driving lines during the first touch group driving period, and the odd-numbered touch driving electrodes are substantially simultaneously driven, and the touch driving signals may be substantially simultaneously applied to the even-numbered touch driving electrodes through the even-numbered touch driving lines during the second touch group driving period, and the even-numbered touch driving electrodes are substantially simultaneously driven.

In example embodiments, in each of the plurality of touch driving columns, the plurality of touch driving electrodes may include first through eighth touch driving electrodes arranged in the column direction. The first, third, fifth, and seventh touch driving electrodes among the first through eighth touch driving electrodes may be substantially simultaneously driven during the first touch group driving period, and the second, fourth, sixth, and eighth touch driving electrodes among the first through eighth touch driving electrodes may be substantially simultaneously driven during the second touch group driving period.

In example embodiments, the first touch group driving period may include first, second, third, and fourth touch group driving sub-periods. In the first touch group driving sub-period, first, third, and fifth touch driving signals having a first edge may be applied to the first, third, and fifth touch driving electrodes, and a seventh touch driving signal having a second edge may be applied to the seventh touch driving electrode. In the second touch group driving sub-period, the first, third, and seventh touch driving signals having the first edge may be applied to the first, third, and seventh touch driving electrodes, and the fifth touch driving signal having the second edge may be applied to the fifth touch driving electrode. In the third touch group driving sub-period, the first, fifth, and seventh touch driving signals having the first edge may be applied to the first, fifth, and seventh touch driving electrodes, and the third touch driving signal having the second edge may be applied to the third touch driving electrode. In the fourth touch group driving sub-period, the third, fifth, and seventh touch driving signals having the first edge may be applied to the third, fifth, and seventh touch driving electrodes, and the first touch driving signal having the second edge may be applied to the first touch driving electrode.

In example embodiments, the second touch group driving period may include fifth, sixth, seventh, and eighth touch group driving sub-periods. In the fifth touch group driving sub-period, second, fourth, and sixth touch driving signals having a first edge may be applied to the second, fourth, and sixth touch driving electrodes, and an eighth touch driving signal having a second edge may be applied to the eighth touch driving electrode. In the sixth touch group driving sub-period, the second, fourth, and eighth touch driving signals having the first edge may be applied to the second, fourth, and eighth touch driving electrodes, and the sixth touch driving signal having the second edge may be applied to the sixth touch driving electrode. In the seventh touch group driving sub-period, the second, sixth, and eighth touch driving signals having the first edge may be applied to the second, sixth, and eighth touch driving electrodes, and the fourth touch driving signal having the second edge may be applied to the fourth touch driving electrode. In the eighth touch group driving sub-period, the fourth, sixth, and eighth touch driving signals having the first edge may be applied to the fourth, sixth, and eighth touch driving electrodes, and the second touch driving signal having the second edge may be applied to the second touch driving electrode.

In example embodiments, the touch sensor may further include a first touch sensing line extending substantially in the column direction and coupled to odd-numbered touch sensing electrodes among the plurality of touch sensing electrodes in each of the plurality of touch sensing columns, and a second touch sensing line extending substantially in the column direction and coupled to even-numbered touch sensing electrodes among the plurality of touch sensing electrodes in each of the plurality of touch sensing columns.

In example embodiments, in each of the plurality of touch sensing columns, the first touch sensing line may be located at a first side of the plurality of touch sensing electrodes. In each of the plurality of touch sensing columns, the second touch sensing line may be located at a second side opposite to the first side of the plurality of touch sensing electrodes.

In example embodiments, each of the plurality of touch driving electrodes is located adjacent to two of the plurality of touch sensing electrodes at one side of each of the plurality of touch driving electrodes, each of the plurality of touch driving electrodes may be arranged in a (2N−1)-th touch row and a 2N-th touch row, and each of the plurality of touch sensing electrodes may be arranged in a (2N−2)-th touch row and the (2N−1)-th touch row, where N is an integer greater than 0.

In example embodiments, the plurality of touch driving electrodes and the plurality of touch sensing electrodes may be located in a same layer.

According to an example embodiment, a display device includes a display panel including a plurality of pixels, a touch sensor disposed on the plurality of pixels, a display driver configured to drive the plurality of pixels, and a touch controller configured to drive the touch sensor. The touch sensor includes a plurality of touch driving electrodes arranged in each of a plurality of touch driving columns in a column direction, and a plurality of touch sensing electrodes arranged in each of a plurality of touch sensing columns in the column direction, the plurality of touch driving columns and the plurality of touch sensing columns being alternately arranged in a row direction. The touch controller is configured to substantially simultaneously drive two or more odd-numbered touch driving electrodes among the plurality of touch driving electrodes in each of the plurality of touch driving columns during a first touch group driving period; and to substantially simultaneously drive two or more even-numbered touch driving electrodes among the plurality of touch driving electrodes in each of the plurality of touch driving columns during a second touch group driving period that is different from the first touch group driving period.

In example embodiments, the touch sensor may further include a plurality of touch driving lines extending substantially in the column direction and respectively connected to the plurality of touch driving electrodes in each of the plurality of touch driving columns. In each of the plurality of touch driving columns, odd-numbered touch driving lines among the plurality of touch driving lines may be connected to the odd-numbered touch driving electrodes at a first side of the plurality of touch driving electrodes. In each of the plurality of touch driving columns, even-numbered touch driving lines among the plurality of touch driving lines may be connected to the even-numbered touch driving electrodes at a second side that is opposite to the first side of the plurality of touch driving electrodes.

In example embodiments, the touch controller may substantially simultaneously apply touch driving signals to the odd-numbered touch driving electrodes through the odd-numbered touch driving lines during the first touch group driving period and drive the odd-numbered touch driving electrodes substantially simultaneously. The touch controller may substantially simultaneously apply the touch driving signals to the even-numbered touch driving electrodes through the even-numbered touch driving lines during the second touch group driving period and drive the even-numbered touch driving electrodes substantially simultaneously.

In example embodiments, in each of the plurality of touch driving columns, the plurality of touch driving electrodes may include first through eighth touch driving electrodes arranged in the column direction. The touch controller may substantially simultaneously drive the first, third, fifth, and seventh touch driving electrodes among the first through eighth touch driving electrodes during the first touch group driving period, and may substantially simultaneously drive the second, fourth, sixth, and eighth touch driving electrodes among the first through eighth touch driving electrodes during the second touch group driving period.

In example embodiments, the first touch group driving period may include first, second, third and fourth touch group driving sub-periods. In the first touch group driving sub-period, the touch controller may apply first, third, and fifth touch driving signals having a first edge to the first, third, and fifth touch driving electrodes, and may apply a seventh touch driving signal having a second edge to the seventh touch driving electrode. In the second touch group driving sub-period, the touch controller may apply the first, third, and seventh touch driving signals having the first edge to the first, third, and seventh touch driving electrodes, and may apply the fifth touch driving signal having the second edge to the fifth touch driving electrode. In the third touch group driving sub-period, the touch controller may apply the first, fifth, and seventh touch driving signals having the first edge to the first, fifth, and seventh touch driving electrodes, and may apply the third touch driving signal having the second edge to the third touch driving electrode. In the fourth touch group driving sub-period, the touch controller may apply the third, fifth, and seventh touch driving signals having the first edge to the third, fifth, and seventh touch driving electrodes, and may apply the first touch driving signal having the second edge to the first touch driving electrode.

In example embodiments, the second touch group driving period may include fifth, sixth, seventh, and eighth touch group driving sub-periods. In the fifth touch group driving sub-period, the touch controller may apply second, fourth, and sixth touch driving signals having a first edge to the second, fourth, and sixth touch driving electrodes, and may apply an eighth touch driving signal having a second edge to the eighth touch driving electrode. In the sixth touch group driving sub-period, the touch controller may apply the second, fourth, and eighth touch driving signals having the first edge to the second, fourth, and eighth touch driving electrodes, and may apply the sixth touch driving signal having the second edge to the sixth touch driving electrode. In the seventh touch group driving sub-period, the touch controller may apply the second, sixth, and eighth touch driving signals having the first edge to the second, sixth, and eighth touch driving electrodes, and may apply the fourth touch driving signal having the second edge to the fourth touch driving electrode. In the eighth touch group driving sub-period, the touch controller may apply the fourth, sixth, and eighth touch driving signals having the first edge to the fourth, sixth, and eighth touch driving electrodes, and may apply the second touch driving signal having the second edge to the second touch driving electrode.

According to an example embodiment, a method of driving a touch sensor that includes a plurality of touch driving electrodes arranged in each of a plurality of touch driving columns in a column direction, and a plurality of touch sensing electrodes arranged in each of a plurality of touch sensing columns in the column direction, the plurality of touch driving columns and the plurality of touch sensing columns being alternately arranged in a row direction. In the method, two or more odd-numbered touch driving electrodes among the plurality of touch driving electrodes in each of the plurality of touch driving columns are substantially simultaneously driven during a first touch group driving period, and two or more even-numbered touch driving electrodes among the plurality of touch driving electrodes in each of the plurality of touch driving columns are substantially simultaneously driven during a second touch group driving period that is different from the first touch group driving period.

In example embodiments, the touch sensor may further include a plurality of touch driving lines extending substantially in the column direction and respectively connected to the plurality of touch driving electrodes in each of the plurality of touch driving columns. To substantially simultaneously drive the odd-numbered touch driving electrodes, touch driving signals may be substantially simultaneously applied to the odd-numbered touch driving electrodes through odd-numbered touch driving lines among the plurality of touch driving lines during the first touch group driving period, the odd-numbered touch driving lines being connected to the odd-numbered touch driving electrodes at a first side of the plurality of touch driving electrodes in each of the plurality of touch driving columns. To substantially simultaneously drive the even-numbered touch driving electrodes, the touch driving signals may be substantially simultaneously applied to the even-numbered touch driving electrodes through even-numbered touch driving lines among the plurality of touch driving lines during the second touch group driving period, the even-numbered touch driving lines being connected to the even-numbered touch driving electrodes at a second side that is opposite to the first side of the plurality of touch driving electrodes in each of the plurality of touch driving columns.

In example embodiments, the plurality of touch driving electrodes may include first through eighth touch driving electrodes arranged in the column direction, and the first touch group driving period may include first, second, third, and fourth touch group driving sub-periods. To substantially simultaneously drive the odd-numbered touch driving electrodes, first, third, and fifth touch driving signals having a first edge may be applied to the first, third, and fifth touch driving electrodes, and a seventh touch driving signal having a second edge may be applied to the seventh touch driving electrode in the first touch group driving sub-period. The first, third, and seventh touch driving signals having the first edge may be applied to the first, third, and seventh touch driving electrodes and the fifth touch driving signal having the second edge may be applied to the fifth touch driving electrode in the second touch group driving sub-period. The first, fifth, and seventh touch driving signals having the first edge may be applied to the first, fifth, and seventh touch driving electrodes and the third touch driving signal having the second edge may be applied to the third touch driving electrode in the third touch group driving sub-period. The third, fifth, and seventh touch driving signals having the first edge may be applied to the third, fifth, and seventh touch driving electrodes and the first touch driving signal having the second edge may be applied to the first touch driving electrode in the fourth touch group driving sub-period.

In example embodiments, the plurality of touch driving electrodes may include first through eighth touch driving electrodes arranged in the column direction, and the second touch group driving period may include fifth, sixth, seventh, and eighth touch group driving sub-periods. To substantially simultaneously drive the even-numbered touch driving electrodes, second, fourth, and sixth touch driving signals having a first edge may be applied to the second, fourth, and sixth touch driving electrodes and an eighth touch driving signal having a second edge may be applied to the eighth touch driving electrode in the fifth touch group driving sub-period. The second, fourth, and eighth touch driving signals having the first edge may be applied to the second, fourth, and eighth touch driving electrodes and the sixth touch driving signal having the second edge may be applied to the sixth touch driving electrode in the sixth touch group driving sub-period. The second, sixth, and eighth touch driving signals having the first edge may be applied to the second, sixth, and eighth touch driving electrodes and the fourth touch driving signal having the second edge may be applied to the fourth touch driving electrode in the seventh touch group driving sub-period. The fourth, sixth, and eighth touch driving signals having the first edge may be applied to the fourth, sixth, and eighth touch driving electrodes and the second touch driving signal having the second edge may be applied to the second touch driving electrode in the eighth touch group driving sub-period.

As described above, in a touch sensor, a display device including the touch sensor, and a method of driving the touch sensor according to example embodiments, two or more odd-numbered touch driving electrodes in each touch driving column may be substantially simultaneously driven during a first touch group driving period, and two or more even-numbered touch driving electrodes in each touch driving column may be substantially simultaneously driven during a second touch group driving period that is different from the first touch group driving period. Accordingly, an undesired parasitic capacitance between lines and/or electrodes of the touch sensor may be reduced, and thus power consumption and a noise of the touch sensor may be reduced.

BRIEF DESCRIPTION OF THE DRAWINGS

Illustrative, non-limiting example embodiments will be more clearly understood from the following detailed description in conjunction with the accompanying drawings.

FIG. 1 is a diagram illustrating a touch sensor according to an example embodiment.

FIG. 6 is a diagram illustrating an example of a touch driving code used for driving a touch sensor according to an example embodiment.

FIG. 8 is a diagram illustrating another example of a touch driving code used for driving a touch sensor according to an example embodiment.

DETAILED DESCRIPTION OF THE EMBODIMENTS

Hereinafter, example embodiments of the present inventive concept will be explained in detail with reference to the accompanying drawings.

Figure 1:
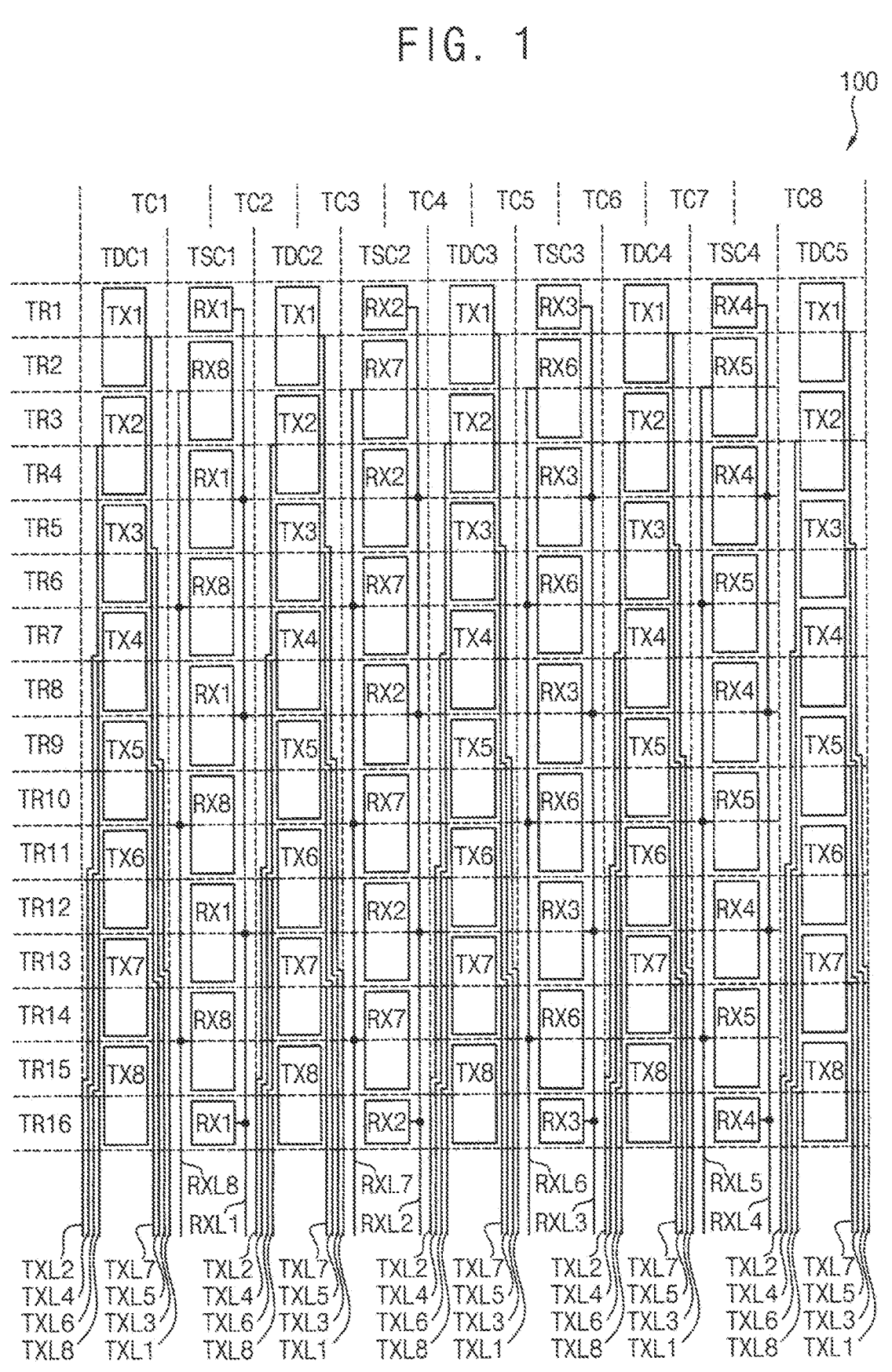
Figure 2:
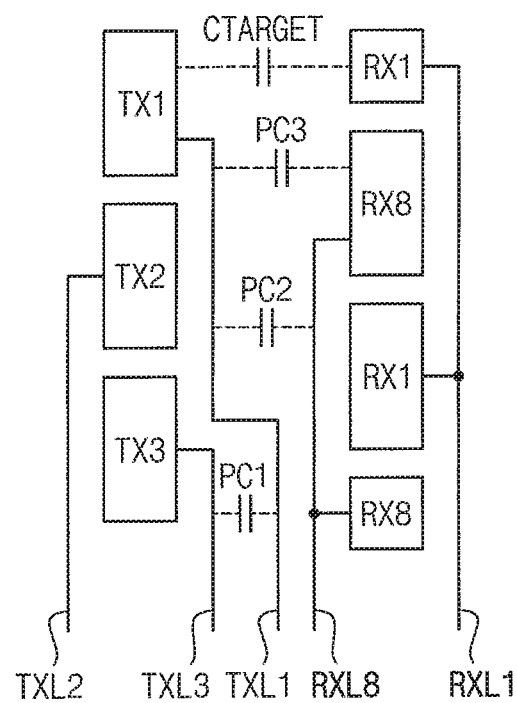
FIG. 2 is a diagram for describing an example of parasitic capacitors of a touch sensor.
Figure 3:
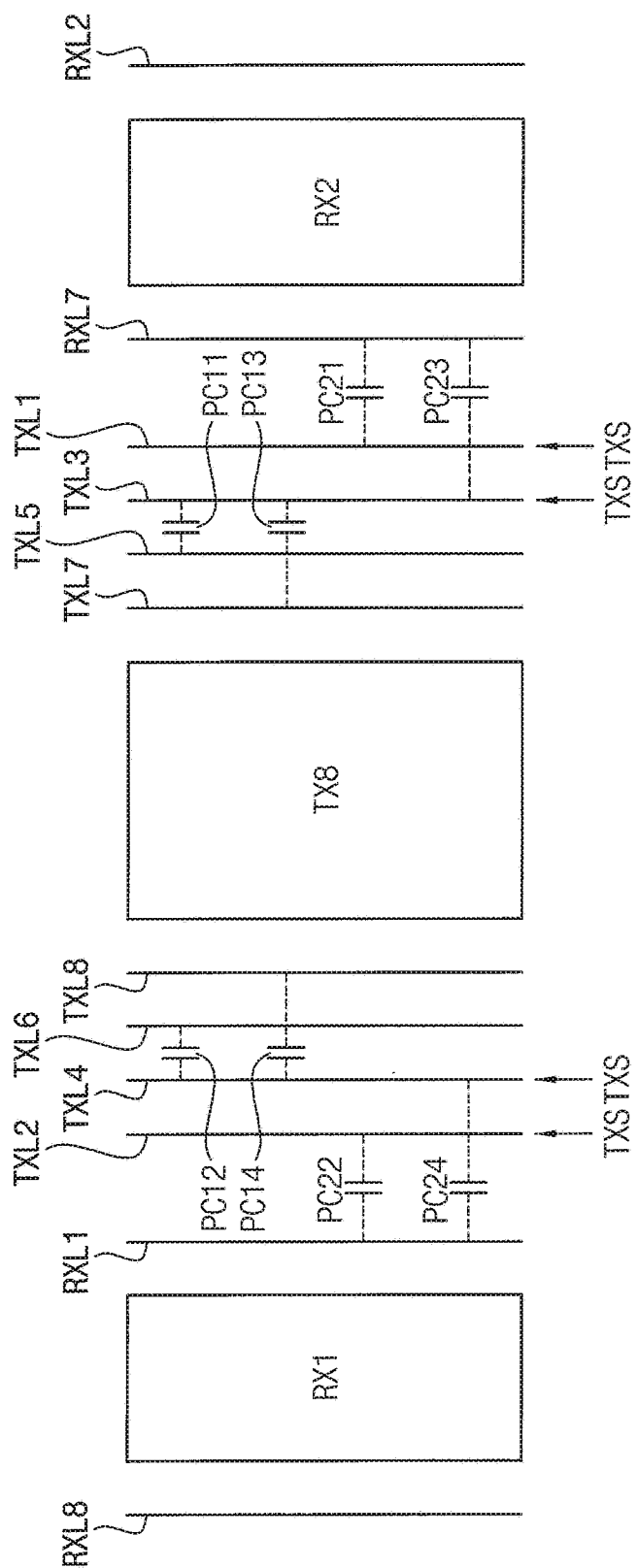
FIG. 3 is a diagram for describing an example of parasitic capacitors of a touch sensor in a case where adjacent touch driving channels are substantially simultaneously driven.
Figure 4:
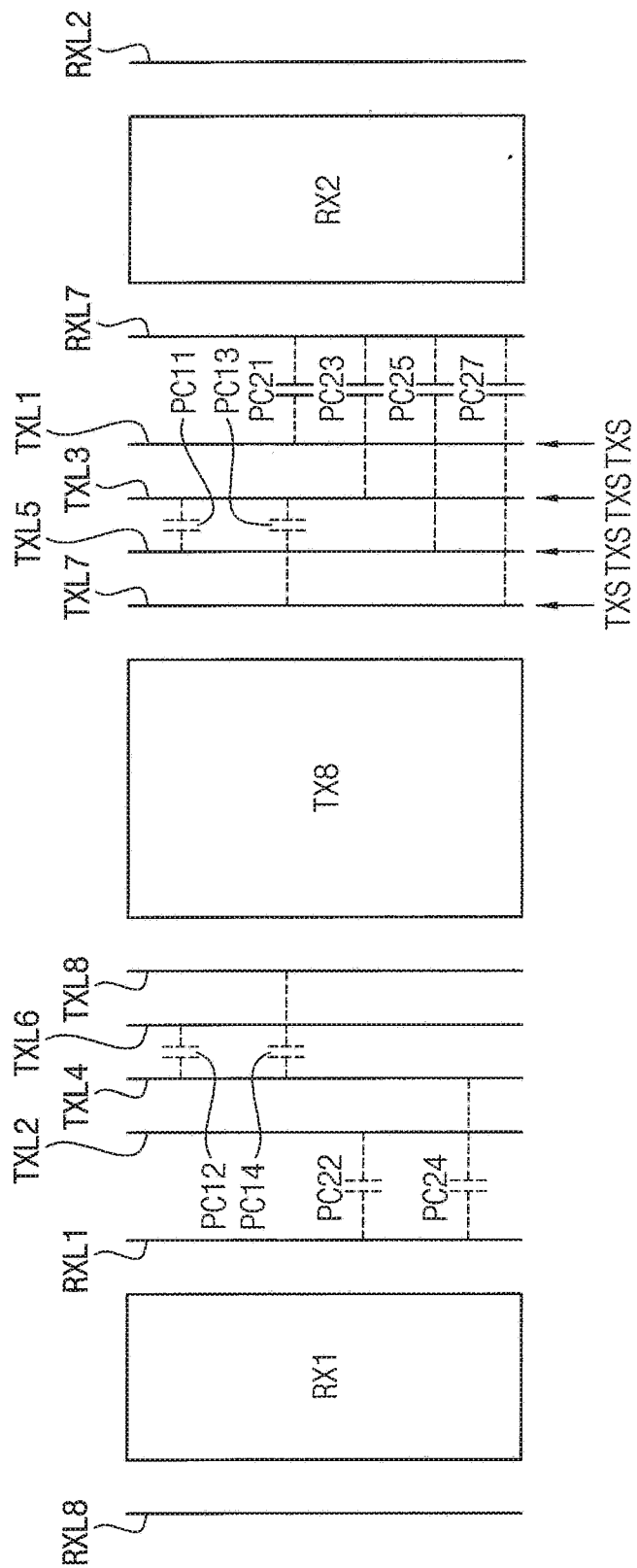
FIG. 4 is a diagram for describing an example of parasitic capacitors of a touch sensor according to an example embodiment.

FIG. 1 is a diagram illustrating a touch sensor according to an example embodiment, FIG. 2 is a diagram for describing an example of parasitic capacitors of a touch sensor, FIG. 3 is a diagram for describing an example of parasitic capacitors of a touch sensor in a case where adjacent touch driving channels are substantially simultaneously driven, and FIG. 4 is a diagram for describing an example of parasitic capacitors of a touch sensor according to an example embodiment.

Referring to FIG. 1, a touch sensor 100 may include a plurality of touch driving electrodes TX1 through TX8, a plurality of touch driving lines TXL1 through TXL8, a plurality of touch sensing electrodes RX1 through RX8, and a plurality of touch sensing lines RXL1 through RXL8.

The touch sensor 100 may have a plurality of touch driving columns TDC1 through TDC5, and each of the touch driving columns TDC1 through TDC5 includes the plurality of touch driving electrodes TX1 through TX8. In each of the touch driving columns TDC1 through TDC5, the touch driving electrodes TX1 through TX8 are respectively connected to corresponding touch driving lines TXL1 through TXL8. Further, each touch driving electrode TX1 through TX8 may be arranged in a (2N−1)-th touch row and a 2N-th touch row, where N is an integer greater than 0. For example, as illustrated in FIG. 1, in each touch driving column TDC1 through TDC5, the first touch driving electrode TX1 may be arranged in first and second touch rows TR1 and TR2, the second touch driving electrode TX2 may be arranged in third and fourth touch rows TR3 and TR4, the third touch driving electrode TX3 may be arranged in fifth and sixth touch rows TR5 and TR6, the fourth touch driving electrode TX4 may be arranged in seventh and eighth touch rows TR7 and TR8, the fifth touch driving electrode TX5 may be arranged in ninth and tenth touch rows TR9 and TR10, the sixth touch driving electrode TX6 may be arranged in eleventh and twelfth touch rows TR11 and TR12, the seventh touch driving electrode TX7 may be arranged in thirteenth and fourteenth touch rows TR13 and TR14, and the eighth touch driving electrode TX8 may be arranged in fifteenth and sixteenth touch rows TR15 and TR16.

In each touch driving column TDC1 through TDC5, the plurality of touch driving lines TXL1 through TXL8 may be respectively connected to the plurality of touch driving electrodes TX1 through TX8, and may respectively transfer touch driving signals to the plurality of touch driving electrodes TX1 through TX8. In some example embodiments, the touch driving lines (e.g., TXL1) connected to the touch driving electrodes (e.g., TX1) in the same touch rows (e.g., TR1 and TR2) may provide the same touch driving signal to the touch driving electrodes (e.g., TX1). For example, as illustrated in FIG. 1, the first touch driving lines TXL1 extending in the first through fifth touch driving columns TDC1 through TDC5 may transfer the same first touch driving signal to the first touch driving electrodes TX1 that are disposed in the first and second touch rows TR1 and TR2, the second touch driving lines TXL2 extending in the first through fifth touch driving columns TDC1 through TDC5 may transfer the same second touch driving signal to the second touch driving electrodes TX2 that are disposed in the third and fourth touch rows TR3 and TR4, the third touch driving lines TXL3 extending in the first through fifth touch driving columns TDC1 through TDC5 may transfer the same third touch driving signal to the third touch driving electrodes TX3 that are disposed in the fifth and sixth touch rows TR5 and TR6, the fourth touch driving lines TXL4 extending in the first through fifth touch driving columns TDC1 through TDC5 may transfer the same fourth touch driving signal to the fourth touch driving electrodes TX4 that are disposed in the seventh and eighth touch rows TR7 and TR8, the fifth touch driving lines TXL5 extending in the first through fifth touch driving columns TDC1 through TDC5 may transfer the same fifth touch driving signal to the fifth touch driving electrodes TX5 that are disposed in the ninth and tenth touch rows TR9 and TR10, the sixth touch driving lines TXL6 extending in the first through fifth touch driving columns TDC1 through TDC5 may transfer the same sixth touch driving signal to the sixth touch driving electrodes TX6 that are disposed in the eleventh and twelfth touch rows TR11 and TR12, the seventh touch driving lines TXL7 extending in the first through fifth touch driving columns TDC1 through TDC5 may transfer the same seventh touch driving signal to the seventh touch driving electrodes TX7 that are disposed in the thirteenth and fourteenth touch rows TR13 and TR14, and the eighth touch driving lines TXL8 extending in the first through fifth touch driving columns TDC1 through TDC5 may transfer the same eighth touch driving signal to the eighth touch driving electrodes TX8 that are disposed in the fifteenth and sixteenth touch rows TR15 and TR16. Accordingly, the touch driving electrodes (e.g., TX1) that are located in the same touch rows (e.g., TR1 and TR2) and the different touch driving columns TDC1 through TDC5 may receive the same touch driving signal from the same touch driving channel of a touch controller (e.g., a touch controller 540 in FIG. 10), and may be substantially simultaneously driven based on the same touch driving signal.

In some example embodiments, in each touch driving column TDC1 through TDC5, odd-numbered touch driving lines TXL1, TXL3, TXL5, and TXL7 that are connected to odd-numbered touch driving electrodes TX1, TX3, TX5, and TX7 for transferring the touch driving signals received from odd-numbered touch driving channels may be located at a first side (e.g., a right side) of the plurality of touch driving electrodes TX1 through TX8, and even-numbered touch driving lines TXL2, TXL4, TXL6, and TXL8 that are connected to even-numbered touch driving electrodes TX2, TX4, TX6, and TX8 for transferring the touch driving signals received from even-numbered touch driving channels may be located at a second side (e.g., a left side) opposite to the first side of the plurality of touch driving electrodes TX1 through TX8. For example, as illustrated in FIG. 1, the first through eighth touch driving electrodes TX1 through TX8 may be arranged in sequence in each touch driving column TDC1 through TDC5, the first, third, fifth and seventh touch driving electrodes touch driving lines TXL1, TXL3, TXL5, and TXL7 that are connected to the first, third, fifth, and seventh touch driving electrodes TX1, TX3, TX5, and TX7 may be located at the right side of the first through eighth touch driving electrodes TX1 through TX8, and the second, fourth, sixth, and eighth touch driving lines TXL2, TXL4, TXL6, and TXL8 that are connected to the second, fourth, sixth, and eighth touch driving electrodes TX2, TX4, TX6, and TX8 may be located at the left side of the first through eighth touch driving electrodes TX1 through TX8.

Although FIG. 1 illustrates an example of the touch sensor 100 that has the five touch driving columns TDC1 through TDC5 and includes the eight touch driving electrodes TX1 through TX8 and the eight touch driving lines TXL1 through TX8 in each touch driving column TDC1 through TDC5, the number of touch driving columns, the number of the touch driving electrodes in each touch driving column, and the number of touch driving lines corresponding to the touch driving electrodes may not be limited to the example illustrated in FIG. 1.

The touch sensor 100 may have a plurality of touch sensing columns TSC1 through TSC4 that are alternately located with respect to the plurality of touch driving columns TDC1 through TDC5. In each touch sensing column, some electrodes of the touch sensing electrodes RX1 through RX8 are connected alternately to two touch sensing lines of the touch sensing lines RXL1 through RXL8. For example, the first and eighth touch sensing electrodes RX1 and RX8 are arranged in the first touch sensing column TSC1 and connected alternatively to the first and eighth touch sensing lines RXL1 and RXL8. In some example embodiments, except for the touch sensing electrodes RX1 through RX4 in the uppermost touch row, i.e., the first touch row TR1, and the lowermost touch row, i.e., the sixteenth touch row TR16, each touch sensing electrode RX1 through RX8 may be arranged in an (2N−2)-th touch row and the (2N−1)-th touch row. For example, as illustrated in FIG. 1, in first through fourth touch sensing columns TSC1 through TSC4, first through fourth touch sensing electrodes RX1, RX2, RX3, and RX4 may be located in the first touch row TR1, eighth through fifth touch sensing electrodes RX8, RX7, RX6, and RX5 may be located in the second and third touch rows TR2 and TR3, the first through fourth touch sensing electrodes RX1, RX2, RX3, and RX4 may be located in the fourth and fifth touch rows TR4 and TR5, the eighth through fifth touch sensing electrodes RX8, RX7, RX6, and RX5 may be located in the sixth and seventh touch rows TR6 and TR7, the first through fourth touch sensing electrodes RX1, RX2, RX3, and RX4 may be located in the eighth and ninth touch rows TR8 and TR9, the eighth through fifth touch sensing electrodes RX8, RX7, RX6, and RX5 may be located in the tenth and eleventh touch rows TR10 and TR11, the first through fourth touch sensing electrodes RX1, RX2, RX3, and RX4 may be located in the twelfth and thirteenth touch rows TR12 and TR13, the eighth through fifth touch sensing electrodes RX8, RX7, RX6, and RX5 may be located in the fourteenth and fifteenth touch rows TR14 and TR15, and the first through fourth touch sensing electrodes RX1, RX2, RX3, and RX4 may be located in the sixteenth touch row TR16.

In some example embodiments, two touch sensing lines (e.g., RXL1 and RXL8) may be located in each touch sensing column (e.g., TSC1), odd-numbered touch sensing electrodes (e.g., RX1) among the plurality of touch sensing electrodes (e.g., RX1 and RX8) in each touch sensing column (e.g., TSC1) may be connected to one (e.g., RXL1) of the two touch sensing lines (e.g., RXL1 and RXL8), and even-numbered touch sensing electrodes (e.g., RX8) among the plurality of touch sensing electrodes (e.g., RX1 and RX8) in each touch sensing column (e.g., TSC1) may be connected to the other (e.g., RXL8) of the two touch sensing lines (e.g., RXL1 and RXL8). For example, as illustrated in FIG. 1, the odd-numbered touch sensing electrodes RX1 in the first touch sensing column TSC1 may be connected to the first touch sensing line RXL1, the odd-numbered touch sensing electrodes RX2 in the second touch sensing column TSC2 may be connected to the second touch sensing line RXL2, the odd-numbered touch sensing electrodes RX3 in the third touch sensing column TSC3 may be connected to the third touch sensing line RXL3, the odd-numbered touch sensing electrodes RX4 in the fourth touch sensing column TSC4 may be connected to the fourth touch sensing line RXL4. The even-numbered touch sensing electrodes RX5 in the fourth touch sensing column TSC4 may be connected to the fifth touch sensing line RXL5, the even-numbered touch sensing electrodes RX6 in the third touch sensing column TSC3 may be connected to the sixth touch sensing line RXL6, the even-numbered touch sensing electrodes RX7 in the second touch sensing column TSC2 may be connected to the seventh touch sensing line RXL7, and the even-numbered touch sensing electrodes RX8 in the first touch sensing column TSC1 may be connected to the eighth touch sensing line RXL8. Further, the first through eighth touch sensing line RXL1 through RXL8 may be connected to first through eighth touch sensing channels of the touch controller (e.g., the touch controller 540 in FIG. 10), and may transfer first through eighth touch sensing signals induced at first through eighth touch sensing electrodes RX1 through RX8 to the first through eighth touch sensing channels, respectively. In some example embodiments, in each touch sensing column (e.g., TSC1), the one (e.g., RXL1) of the two touch sensing lines (e.g., RXL1 and RXL8) may be located at a first side (e.g., a right side) of the plurality of touch sensing electrodes (e.g., RX1 and RX8), and the other (e.g., RXL8) of the two touch sensing lines (e.g., RXL1 and RXL8) may be located at a second side (e.g., a left side) opposite to the first side of the plurality of touch sensing electrodes (e.g., RX1 and RX8).

Although FIG. 1 illustrates an example of the touch sensor 100 that has the four touch sensing columns TSC1 through TSC4 and includes two touch sensing electrodes (e.g., RX1 and RX8) and the two touch sensing lines (e.g., RXL1 and RXL8) in each touch sensing column (e.g., TSC1), the number of touch sensing columns, the number of the touch sensing electrodes and the number of touch sensing lines in each touch sensing column may not be limited to the example of FIG. 1. Further, although FIG. 1 illustrates an example of the touch sensor 100 that has the touch driving columns TDC1 and TDC5 at left and right edges, in some example embodiments, the touch sensor 100 may have a touch sensing column at the left edge, at the right edge, or at the left and right edges.

In some example embodiments, the touch sensor 100 may be a one-layer (1-L) touch sensor where the plurality of touch driving electrodes TX1 through TX8, the plurality of touch driving lines TXL1 through TXL8, the plurality of touch sensing electrodes RX1 through RX8, and the plurality of touch sensing lines RXL1 through RXL8 are formed in a single layer. In this case, compared with a conventional touch sensor where touch driving and sensing electrodes are disposed in different layers or where electrodes or bridges are formed in different layers, a thickness of the touch sensor 100 may be reduced.

Further, in some example embodiments, as described above, each touch driving electrode TX1 through TX8 may be arranged in the (2N−1)-th touch row and the 2N-th touch row, each touch sensing electrode RX1 through RX8 may be arranged in the (2N−2)-th touch row and the (2N−1)-th touch row, and each touch driving electrode (e.g., TX1) may be adjacent to two touch sensing electrodes (e.g., RX1 and RX8) at one side of the touch driving electrode (e.g., TX1). Accordingly, each touch driving electrode (e.g., the second touch driving electrode TX2 in the second touch driving column TDC2) that is away from the left and right edges may be adjacent to four touch sensing electrodes (e.g., RX1, RX2, RX7, and RX8). In addition, since adjacent touch driving and sensing electrodes (e.g., TX1 and RX8) are located in different touch rows, a resolution and an accuracy of the touch sensor 100 may be improved.

In the touch sensor 100, the touch driving signals may be provided to the plurality of touch driving electrodes TX1 through TX8 through the plurality of touch driving lines TXL1 through TXL8, the touch sensing signals may be induced at the plurality of touch sensing electrodes RX1 through RX8 based on the touch driving signals by capacitive coupling between the plurality of touch driving electrodes TX1 through TX8 and the plurality of touch sensing electrodes RX1 through RX8, and the touch sensing signals may be output through the plurality of touch sensing lines RXL1 through RXL8. Further, the touch sensor 100 may detect a change of a mutual capacitance between a corresponding touch driving electrode and a corresponding touch sensing electrode caused by a touch input by a conductive object based on the touch sensing signals output through the plurality of touch sensing lines RXL1 through RXL8 and detect a touch row (e.g., touch rows TR1 through TR16) and a touch column (e.g., touch columns TC1 through TC8) corresponding to the touch input.

For example, while the first touch driving electrodes TX1 are driven by the corresponding touch driving signal, a touch input in the first and second rows TR1 and TR2 and first through eighth touch columns TC1 through TC8 may be detected based on the touch sensing signals received from the first through eighth touch sensing electrodes RX1 through RX8. Similarly, while the second touch driving electrodes TX2 are driven, a touch input in the third and fourth touch rows TR3 and TR4 and the first through eighth touch columns TC1 through TC8 may be detected. Similarly, while the third touch driving electrodes TX3 are driven, a touch input in the fifth and sixth touch rows TR5 and TR6 and the first through eighth touch columns TC1 through TC8 may be detected. Similarly, while the fourth touch driving electrodes TX4 are driven, a touch input in the seventh and eighth touch rows TR7 and TR8 and the first through eighth touch columns TC1 through TC8 may be detected. Similarly, while the fifth touch driving electrodes TX5 are driven, a touch input in the ninth and tenth touch rows TR9 and TR10 and the first through eighth touch columns TC1 through TC8 may be detected. Similarly, while the sixth touch driving electrodes TX6 are driven, a touch input in the eleventh and twelfth touch rows TR11 and TR12 and the first through eighth touch columns TC1 through TC8 may be detected. Similarly, while the seventh touch driving electrodes TX7 are driven, a touch input in the thirteenth and fourteenth touch rows TR13 and TR14 and the first through eighth touch columns TC1 through TC8 may be detected. Similarly, while the eighth touch driving electrodes TX8 are driven, a touch input in the fifteenth and sixteenth touch rows TR15 and TR16 and the first through eighth touch columns TC1 through TC8 may be detected. Although FIG. 1 illustrates an example where the touch sensor 100 may detect a touch input in the sixteen touch rows TR1 through TR16 and the eight touch columns TC1 through TC8, the number of touch rows and the number of touch columns may not be limited to the example of FIG. 1.

In detecting a touch input, a parasitic capacitance between adjacent lines and/or adjacent electrodes may increase power consumption and a noise in the lines and the electrodes. For example, as illustrated in FIGS. 1 and 2, the touch sensor 100 may detect a touch input in the first touch row TR1 and the first touch column TC1 by detecting a capacitance change of a target capacitor CTARGET between the first touch driving electrode TX1 in the first touch driving column TDC1 and the first touch sensing electrode RX1 in the first touch sensing column TSC1 that is adjacent to the first touch driving column TDC1. In this case, the first touch driving electrode TX1 and the first touch driving line TXL1 may be driven or activated. However, a first parasitic capacitor PC1 may be formed between the first touch driving line TXL1 and the third touch driving line TXL3 that is adjacent to the first touch driving line TXL1, and power for charging the first parasitic capacitor PC1 may be additionally consumed in driving the first touch driving line TXL1. Further, due to a second parasitic capacitor PC2 may be formed between the first touch driving line TXL1 and the eighth touch sensing line RXL8 that is adjacent to the first touch driving line TXL1, a third parasitic capacitor PC3 may be formed between the first touch driving line TXL1 and the eighth touch sensing electrode RX8 that is adjacent to the first touch driving line TXL1, a noise may occur in the touch driving signal that is applied to the first touch driving electrode TX1 and/or in the touch sensing signals that is output through the touch sensing lines RXL1 and RXL8. The parasitic capacitors (e.g., first, second, and third parasitic capacitors PC1, PC2, and PC3) may increase the power consumption and a noise in the touch driving signals and/or the touch sensing signals not only in a case where a single touch driving channel (or a touch driving channel connected to the first touch driving line TXL1) is driven as illustrated in FIG. 2, but also in a case where adjacent touch driving channels are substantially simultaneously driven as illustrated in FIG. 3.

FIG. 3 illustrates an example of the touch sensor 100 that drives adjacent first through fourth touch driving channels substantially simultaneously. FIG. 3 shows a portion of the touch sensor 100 where the sixteenth touch row TR16 crosses the first touch sensing column TSC1, the second touch driving column TDC2, and the second touch sensing column TSC2. Referring to FIGS. 1 and 3, when touch driving signals TX5 are applied to the first through fourth touch driving electrodes TX1 through TX4 through the first through fourth touch driving lines TXL1 through TXL4, or when the fourth touch driving electrodes TX1 through TX4 and the first through fourth touch driving lines TXL1 through TXL4 are driven, first parasitic capacitors PC11 through PC14 may be formed between the driven touch driving lines (e.g., TXL4 and TXL3) and non-driven touch driving lines (e.g., TXL5 through TXL8) consuming additional power to charge the parasitic capacitors PC11 through PC14. Further, second parasitic capacitors PC21 through PC24 may be formed between the driven touch driving lines TXL1 through TXL4 and adjacent touch sensing lines RXL1 and RXL7 may cause a noise in the touch driving signal and/or the touch sensing signals.

However, the touch sensor 100, in each touch driving column TDC1 through TDC5, may drive two or more odd-numbered touch driving electrodes TX1, TX3, TX5 and TX7 among the plurality of touch driving electrodes TX1 through TX8 substantially simultaneously during a first touch group driving period, and drive two or more even-numbered touch driving electrodes TX2, TX4, TX6 and TX8 among the plurality of touch driving electrodes TX1 through TX8 substantially simultaneously during a second touch group driving period that is different from the first touch group driving period. In some example embodiments, the touch driving signals TX5 may be substantially simultaneously applied to the odd-numbered touch driving electrodes TX1, TX3, TX5, and TX7 through the odd-numbered touch driving lines TXL1, TXL3, TXL5, and TXL7 during the first touch group driving period, and the touch driving signals TX5 may be substantially simultaneously applied to the even-numbered touch driving electrodes TX2, TX4, TX6, and TX8 through the even-numbered touch driving lines TXL2, TXL4, TXL6, and TXL8 during the second touch group driving period. For example, the first through eighth touch driving electrodes TX1 through TX8 may be arranged in sequence in each touch driving column TDC1 through TDC5, the first, third, fifth, and seventh touch driving electrodes TX1, TX3, TX5, and TX7 may be substantially simultaneously driven during the first touch group driving period, and the second, fourth, sixth, and eighth touch driving electrodes TX2, TX4, TX6, and TX8 may be substantially simultaneously driven during the second touch group driving period.

The touch sensor 100 may reduce the power consumption and a noise in the touch driving signals and/or the touch sensing signals by driving the odd-numbered touch driving electrodes TX1, TX3, TX,5 and TX7 substantially simultaneously, and driving the even-numbered touch driving electrodes TX2, TX4, TX6, and TX8 substantially simultaneously during different touch group driving periods. FIG. 4 illustrates a portion of the touch sensor 100 where the sixteenth touch row TR16 crosses the first touch sensing column TSC1, the second touch driving column TDC2, and the second touch sensing column TSC2. Referring to FIG. 4, the odd-numbered touch driving electrodes TX1, TX3, TX5, and TX7 and the odd-numbered touch driving lines TXL1, TXL3, TXL5, and TXL7 may be substantially simultaneously driven, and the driven touch driving lines TXL1, TXL3, TXL5, and TXL7 may be spaced apart from the non-driven driven touch driving lines TXL2, TXL4, TXL6, and TXL8. Thus, the first parasitic capacitors PC11 through PC14 illustrated in FIG. 3 may not be formed. Accordingly, the touch sensor 100 may prevent or reduce the additional power consumption for charging the parasitic capacitors PC11 through PC14.

While the example of FIG. 3 shows the second parasitic capacitors PC21 and PC23 formed between the first and third touch driving lines TXL1 and TXL3 and the seventh touch sensing line RXL7 and the second parasitic capacitors PC22 and PC24 formed between the second and fourth touch driving lines TXL2 and TXL4 and the first touch sensing line RXL1, the example of FIG. 4 shows the second parasitic capacitors PC21, PC23, PC25, and PC27 formed between the first, third, fifth, and seventh touch driving electrodes touch driving lines TXL1, TXL3, TXL5, and TXL7 and the seventh touch sensing line RXL7. Suppose that a capacitance value of the second capacitor PC21 between the first touch driving line TXL1 and the seventh touch sensing line RXL7 is 1, the second capacitor PC23 between the third touch driving line TXL3 and the seventh touch sensing line RXL7 may have a capacitance value of about 0.5, the second capacitor PC25 between the fifth touch driving line TXL5 and the seventh touch sensing line RXL7 may have a capacitance value of about 0.25, and the second capacitor PC27 between the seventh touch driving line TXL7 and the seventh touch sensing line RXL7 may have a capacitance value of about 0.125. Further, the sign of the capacitance values may be positive or negative according to each touch driving signal has a rising edge or a falling edge. Thus, compared with the example of FIG. 3 where the second capacitor PC21 between the first touch driving line TXL1 and the seventh touch sensing line RXL7 has a capacitance value of about 1, the second capacitor PC22 between the third touch driving line TXL3 and the first touch sensing line RXL1 has a capacitance value of about 1, the second capacitor PC23 between the third touch driving line TXL3 and the seventh touch sensing line RXL7 has a capacitance value of about 0.5, and the second capacitor PC24 between the fourth touch driving line TXL4 and the first touch sensing line RXL1 has a capacitance value of about 0.5, the touch sensor 100 shown in the example of FIG. 4 may reduce the capacitance of the second parasitic capacitors PC21, PC23, PC25 and PC27. Accordingly, the touch sensor 100 may reduce the noise caused by the second parasitic capacitors PC21, PC23, PC25 and PC27 in the touch driving signal and/or the touch sensing signals.

As described above, the touch sensor 100 may drive the odd-numbered touch driving electrodes TX1, TX3, TX5, and TX7 substantially simultaneously, and the even-numbered touch driving electrodes TX2, TX4, TX6, and TX8 substantially simultaneously in different touch group driving periods. Accordingly, the touch sensor 100 may reduce an undesired parasitic capacitance between the touch driving lines TXL1 through TXL8 and the touch sensing lines RXL1 through RXL8 and the touch driving electrodes TX1 through TX8 and the touch sensing electrodes RX1 through RX8, thereby reducing power consumption and a noise in the touch driving signals and/or the touch sensing signals.

Figure 5:
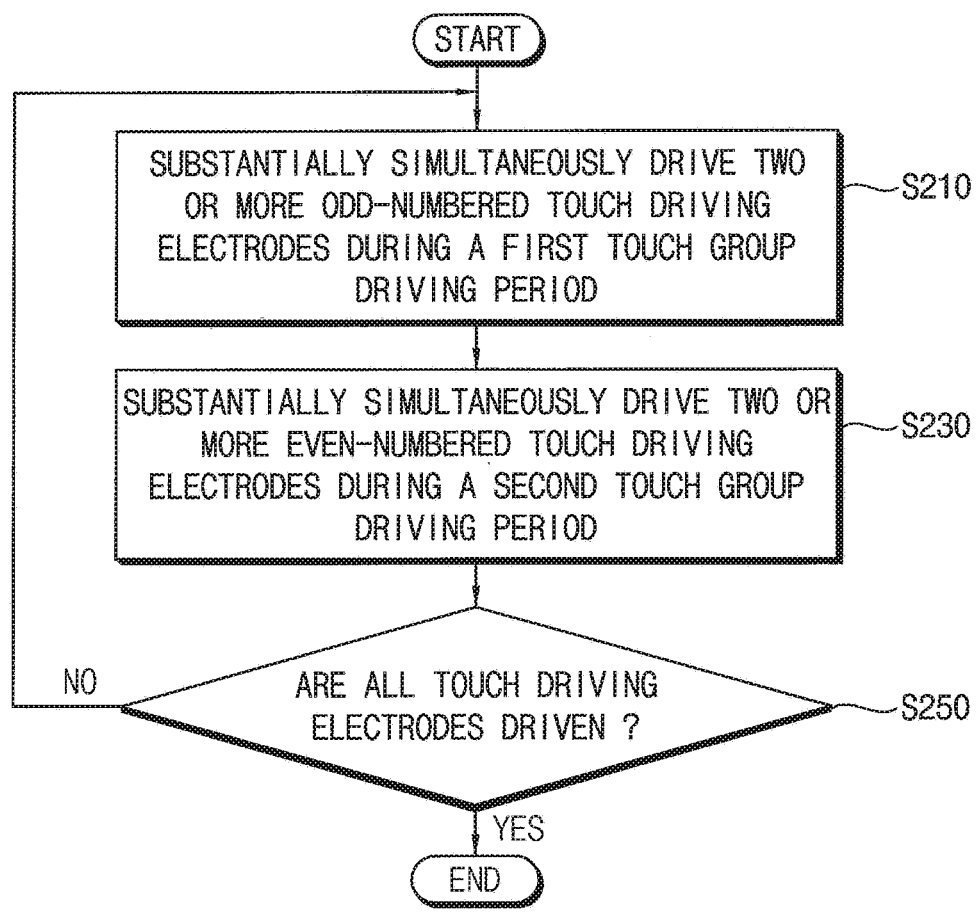
FIG. 5 is a flowchart illustrating a method of driving a touch sensor according to an example embodiment.
Figure 7:
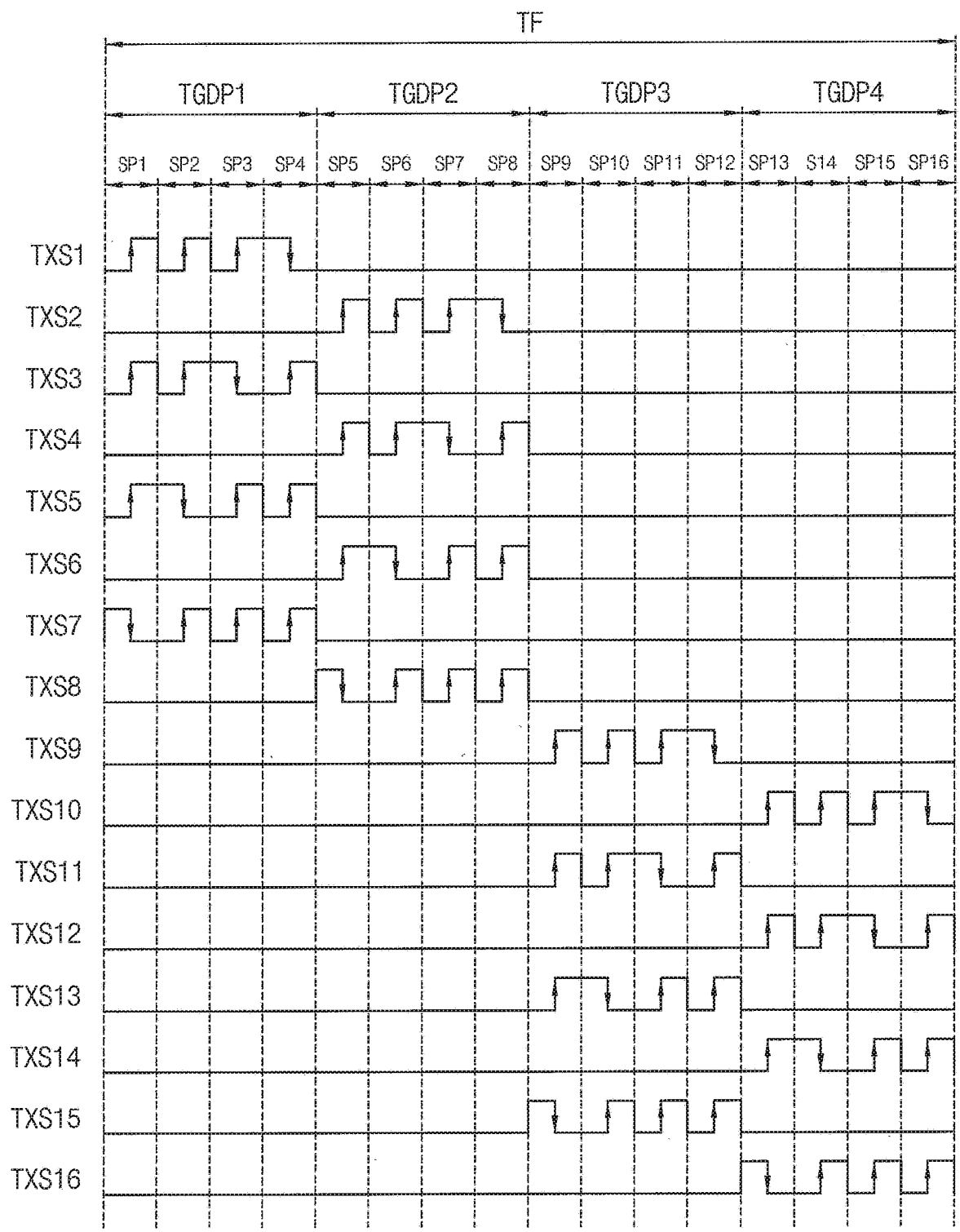
FIG. 7 is a timing diagram for describing an example of driving a touch sensor using a touch driving code of FIG. 6.
Figure 9:
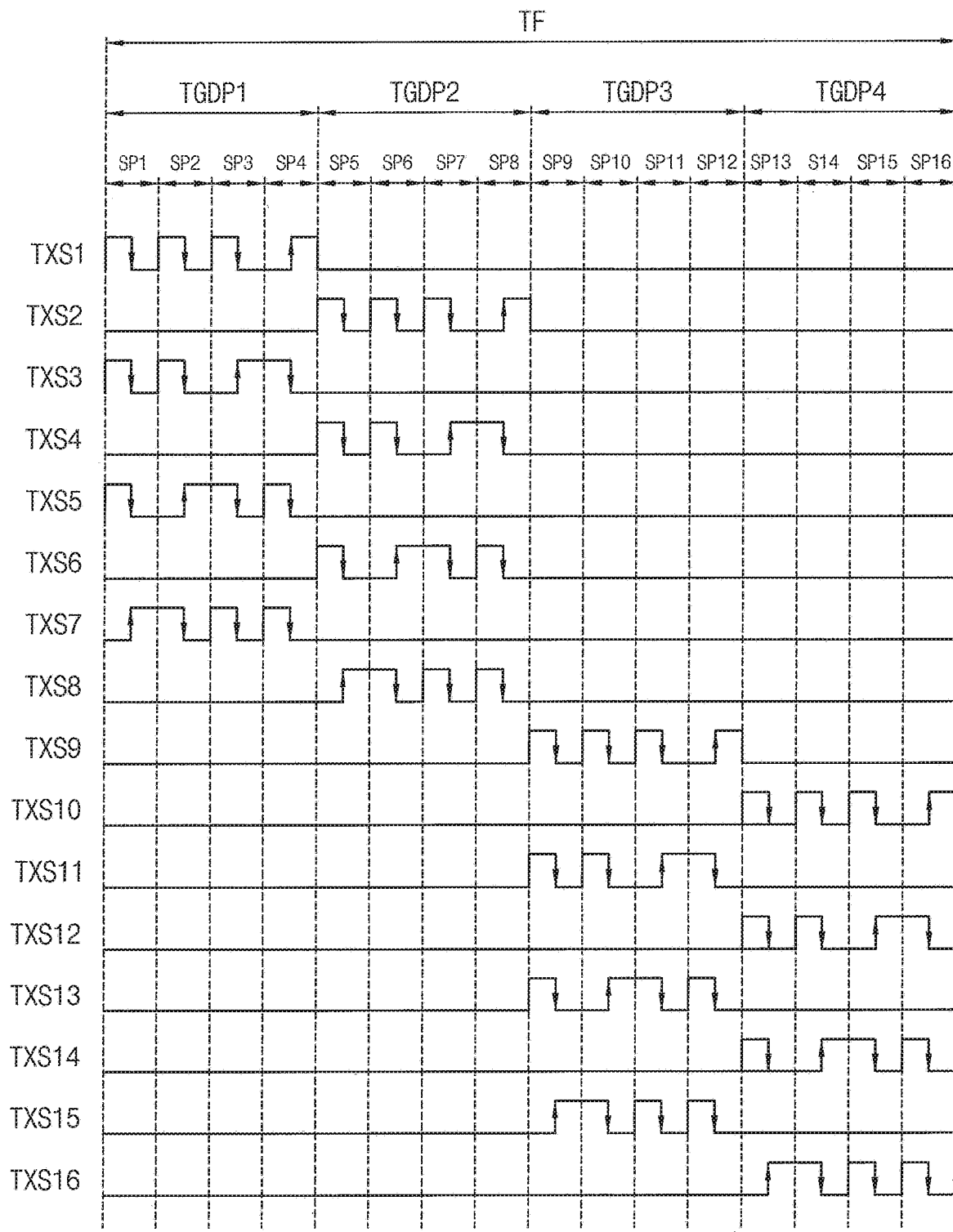
FIG. 9 is a timing diagram for describing an example of driving a touch sensor using a touch driving code of FIG. 8.

FIG. 5 is a flowchart illustrating a method of driving a touch sensor according to an example embodiment, FIG. 6 is a diagram illustrating an example of a touch driving code used for driving a touch sensor according to an example embodiment, FIG. 7 is a timing diagram for describing an example of driving a touch sensor using a touch driving code of FIG. 6, FIG. 8 is a diagram illustrating another example of a touch driving code used for driving a touch sensor according to an example embodiment, and FIG. 9 is a timing diagram for describing an example of driving a touch sensor using a touch driving code of FIG. 8.

Referring to FIGS. 1 and 5, the touch sensor 100 may drive two or more odd-numbered touch driving electrodes (e.g., TX1, TX3, TX5, and TX7) among a plurality of touch driving electrodes TX1 through TX8 in each touch driving column TDC1 through TDC5 substantially simultaneously during a first touch group driving period (S210), and two or more even-numbered touch driving electrodes TX2, TX4, TX6, and TX8 among the plurality of touch driving electrodes TX1 through TX8 in each touch driving column TDC1 through TDC5 substantially simultaneously during a second touch group driving period that is different from the first touch group driving period (S230). For example, during the first touch group driving period, touch driving signals may be substantially simultaneously applied to the odd-numbered touch driving electrodes TX1, TX3, TX5, and TX7 through odd-numbered touch driving lines TXL1, TXL3, TXL5, and TXL7 located at a first side (e.g., a right side) of the plurality of touch driving electrodes TX1 through TX8 in each touch driving column TDC1 through TDC5. During the second touch group driving period, the touch driving signals may be substantially simultaneously applied to the even-numbered touch driving electrodes TX2, TX4, TX6, and TX8 through even-numbered touch driving lines TXL2, TXL4, TXL6, and TXL8 located at a second side (e.g., a left side) opposite to the first side of the plurality of touch driving electrodes TX1 through TX8 in each touch driving column TDC1 through TDC5. Further, simultaneous driving of the odd-numbered touch driving electrodes TX1, TX3, TX5, and TX7 (S210) and this simultaneous driving of the even-numbered touch driving electrodes TX2, TX4, TX6, and TX8 (S230) may be repeated until all of the touch driving electrodes TX1 through TX8 are driven (S250).

FIG. 6 shows an example of a touch driving code 300 that is used to drive the touch sensor 100 as illustrated in FIG. 7. FIG. 7 illustrates an example where the touch sensor 100 includes sixteen touch driving lines in each touch driving column TDC1 through TDC5, and first through sixteenth touch driving signals TXS1 through TXS16 are applied to the sixteen touch driving lines, respectively. In the example of FIG. 7, each touch frame TF may include first through fourth touch group driving periods TGDP1 through TGDP4, and, in each touch group driving period, four touch driving signals may be applied to four touch driving lines, respectively. For example, in the first touch group driving period TGDP1, the touch driving signals TXS1, TXS3, TXS5, and TXS7 are applied to the touch driving lines TXL1, TXL3, TXL5, and TXL7, respectively. Further, the first touch group driving period TGDP1 may include first through fourth touch group driving sub-periods SP1 through SP4, the second touch group driving period TGDP2 may include fifth through eighth touch group driving sub-periods SP5 through SP8, the third touch group driving period TGDP3 may include ninth through twelfth touch group driving sub-periods SP9 through SP12, and the fourth touch group driving period TGDP4 may include thirteenth through sixteenth touch group driving sub-periods SP13 through SP16. Referring to the touch driving code 300 shown in FIG. 6, a touch driving signal having a rising edge is represented as a value of 1, and a touch driving signal having a falling edge is represented as a value of −1. In each touch group driving sub-period (e.g., SP1) of the touch driving code 300, three touch driving signals (e.g., TXS1, TXS3 and TXS5) may have a rising edge, and the remaining one of the touch driving signal (e.g., TXS7) may have a falling edge. Further, in respective touch group driving sub-periods SP1, SP2, SP3 and SP4, the touch driving signals TXS1, TXS3, TXS5, and TXS7 may alternately have a falling edge.

For example, in the first touch group driving sub-period SP1, the first, third, and fifth touch driving signals TXS1, TXS3, and TXS5 having a rising edge may be applied to the first, third, and fifth touch driving electrodes TX1, TX3, and TX5, and the seventh touch driving signal TXS7 having a falling edge may be applied to the seventh touch driving electrode TX7. In the second touch group driving sub-period SP2, the first, third, and seventh touch driving signals TXS1, TXS3, and TXS7 having a rising edge may be applied to the first, third, and seventh touch driving electrodes TX1, TX3, and TX7, and the fifth touch driving signal TXS5 having a falling edge may be applied to the fifth touch driving electrode TX5. In the third touch group driving sub-period SP3, the first, fifth, and seventh touch driving signals TXS1, TXS5, and TXS7 having a rising edge may be applied to the first, fifth, and seventh touch driving electrodes TX1, TX5, and TX7, and the third touch driving signal TXS3 having a falling edge may be applied to the third touch driving electrode TX3. In the fourth touch group driving sub-period SP4, the third, fifth, and seventh touch driving signals TXS3, TXS5, and TXS7 having a rising edge may be applied to the third, fifth, and seventh touch driving electrodes TX3, TX5, and TX7, and the first touch driving signal TXS1 having a falling edge may be applied to the first touch driving electrode TX1. In this manner, the touch sensor 100 may drive the odd-numbered touch driving electrodes TX1, TX3, TX5, and TX7, or the first, third, fifth, and seventh touch driving electrodes TX1, TX3, TX5, and TX7 substantially simultaneously in the first touch group driving period TGDP1.

In the fifth touch group driving sub-period SP5, the second, fourth, and sixth touch driving signals TXS2, TXS4, and TXS6 having a rising edge may be applied to second, fourth, and sixth touch driving electrodes TX2, TX4, and TX6, and the eighth touch driving signal TXS8 having a falling edge may be applied to the eighth touch driving electrode TX8. In the sixth touch group driving sub-period SP6, the second, fourth, and eighth touch driving signals TXS2, TXS4, and TXS8 having a rising edge may be applied to the second, fourth, and eighth touch driving electrodes TX2, TX4, and TX8, and the sixth touch driving signal TXS6 having a falling edge may be applied to the sixth touch driving electrode TX6. In the seventh touch group driving sub-period SP7, the second, sixth, and eighth touch driving signals TXS2, TXS6, and TXS8 having a rising edge may be applied to the second, sixth, and eighth touch driving electrodes TX2, TX6, and TX8, and the fourth touch driving signal TXS4 having a falling edge may be applied to the fourth touch driving electrode TX4. In the eighth touch group driving sub-period SP8, the fourth, sixth, and eighth touch driving signals TXS4, TXS6, and TXS8 having a rising edge may be applied to the fourth, sixth, and eighth touch driving electrodes TX4, TX6, and TX8, and the second touch driving signal TXS2 having a falling edge to the second touch driving electrode TX2. In this manner, the touch sensor 100 may drive, the even-numbered touch driving electrodes TX2, TX4, TX6, and TX8, or the second, fourth, sixth, and eighth touch driving electrodes TX2, TX4, TX6, and TX8 substantially simultaneously in the second touch group driving period TGDP2.

Then, in the third touch group driving period TGDP3, the ninth, eleventh, thirteenth, and fifteenth touch driving signals TXS9, TXS11, TXS13, and TXS15 may be applied to the next odd-numbered touch driving electrodes, or ninth, eleventh, thirteenth, and fifteenth touch driving electrodes, and the touch sensor 100 may drive the ninth, eleventh, thirteenth and fifteenth touch driving electrodes substantially simultaneously. Further, in the fourth touch group driving period TGDP4, the tenth, twelfth, fourteenth, and sixteenth touch driving signals TXS10, TXS12, TXS14, and TXS16 may be applied to the next even-numbered touch driving electrodes, or tenth, twelfth, fourteenth, and sixteenth touch driving electrodes, and the touch sensor 100 may drive the tenth, twelfth, fourteenth and sixteenth touch driving electrodes substantially simultaneously.

FIG. 8 shows another example of a touch driving code 400 that is used to drive the touch sensor 100 as illustrated in FIG. 9. Referring to FIG. 8, in each touch group driving sub-period (e.g., SP1) of the touch driving code 400, three touch driving signals (e.g., TXS1, TXS3, and TXS5) may have a falling edge represented as value of −1, and one touch driving signal (e.g., TXS7) may have a rising edge represented as value of 1. Further, in respective touch group driving sub-periods SP1, SP2, SP3, and SP4, the touch driving signals TXS1, TXS3, TXS5, and TXS7 may alternately have a rising edge. Using the touch driving code 400, the touch sensor 100 may drive the first, third, fifth, and seventh touch driving electrodes TX1, TX3, TX5, and TX7 substantially simultaneously in the first touch group driving period TGDP1, and may drive the second, fourth, sixth, and eighth touch driving electrodes TX2, TX4, TX6, and TX8 substantially simultaneously in the second touch group driving period TGDP2, may drive the ninth, eleventh, thirteenth, and fifteenth touch driving electrodes substantially simultaneously in the third touch group driving period TGDP3, and may drive the tenth, twelfth, fourteenth, and sixteenth touch driving electrodes substantially simultaneously in the fourth touch group driving period TGDP4. FIGS. 6 and 8 illustrate the examples of the touch driving codes 300 and 400, and the touch driving code that may be used for driving the touch sensor 100 may not be limited to the examples of FIGS. 6 and 8.

As described above, the touch sensor 100 may drive the odd-numbered touch driving electrodes TX1, TX3, TX5, and TX7 substantially simultaneously, and the even-numbered touch driving electrodes TX2, TX4, TX6, and TX8 substantially simultaneously in different touch group driving periods. Accordingly, the touch sensor 100 may reduce an undesired parasitic capacitance between the touch driving lines TXL1 through TXL8 and the touch sensing lines RXL1 through RXL8 and the touch driving electrodes TX1 through TX8 and the touch sensing electrodes RX1 through RX8, thereby reducing power consumption and a noise in the touch driving signals and/or the touch sensing signals.

Figure 10:
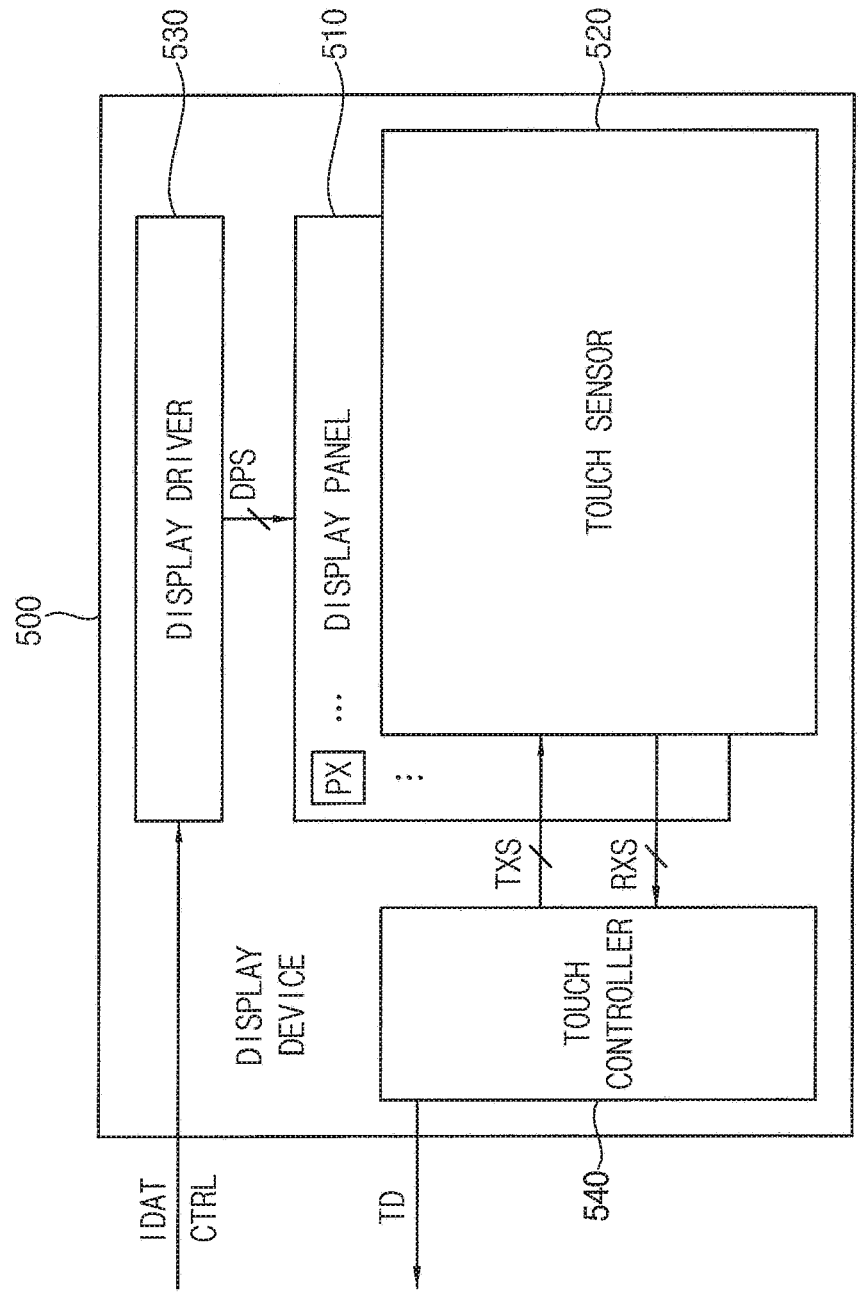
FIG. 10 is a block diagram illustrating a display device according to an example embodiment.
Figure 11:
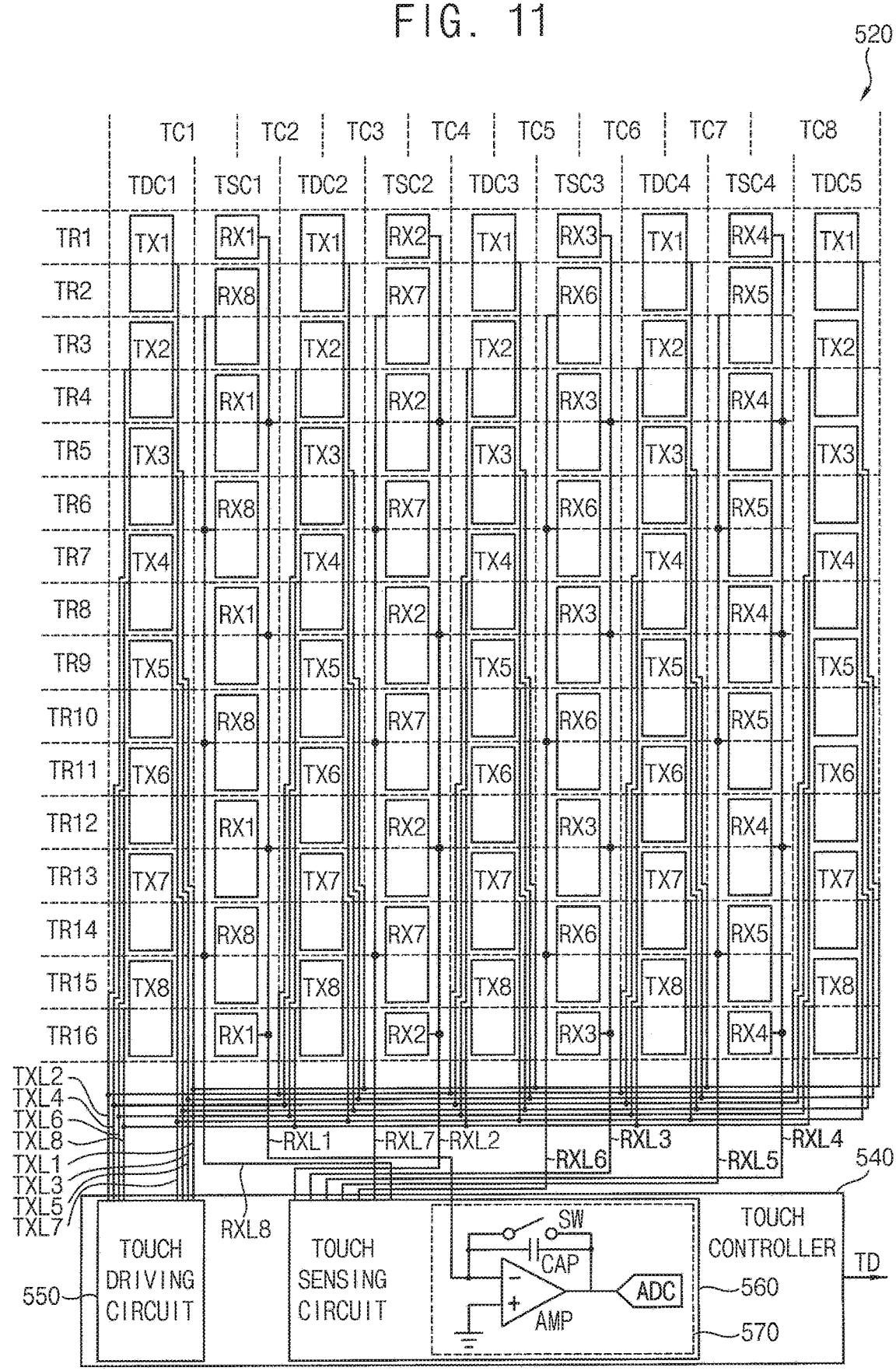
FIG. 11 is a diagram illustrating an example of a touch sensor and a touch controller included in the display device of FIG. 10.

FIG. 10 is a block diagram illustrating a display device according to an example embodiment, and FIG. 11 is a diagram illustrating an example of a touch sensor and a touch controller included in the display device of FIG. 10.

Referring to FIG. 10, a display device 500 may include a display panel 510 including a plurality of pixels PX, a touch sensor 520 on the plurality of pixels PX, a display driver 530 for driving the plurality of pixels PX, and a touch controller 540 for controlling the touch sensor 520.

The display driver 530 may drive the display panel 510 to display an image. The display panel 510 may further include a plurality of data lines and a plurality of scan lines, and each of the pixels PX is coupled to respective ones of the data lines and the scan lines. In some example embodiments, the display panel 510 may be an organic light emitting diode (OLED) display panel where each pixel PX includes an OLED. In other example embodiments, the display panel 510 may be a liquid crystal display (LCD) panel, a light emitting diode (LED) display panel, a field emission display (FED) panel, or any other suitable display panel.

The display driver 530 may drive the display panel 510 based on input image data IDAT and a control signal CTRL received from an external processor (e.g., a graphic processing unit (GPU), an application processor (AP), or a graphic card). The input image data IDAT may be RGB image data including red image data, green image data, and blue image data. Further, the control signal CTRL may include, but is not limited to, a vertical synchronization signal, a horizontal synchronization signal, an input data enable signal, a master clock signal, etc. The display driver 530 may generate display panel driving signals DPS based on the input image data IDAT and the control signal CTRL and drive the display panel 510 by providing the display panel driving signals DPS to the display panel 510. The display panel driving signals DPS may include scan signals and data signals. In some embodiments, the display driver 530 may include a scan driver for providing the scan signals to the display panel 510, a data driver for providing the data signals to the display panel 510, and a timing controller for controlling the scan driver and the data driver.

The touch sensor 520 may be a capacitive touch sensor that detects a change in capacitance caused by a touch input by a conductive object (e.g., a finger, a stylus pen, etc.). For example, the touch sensor 520 may correspond to the touch sensor 100 illustrated in FIG. 1 that may have the plurality of touch driving columns TDC1 through TDC5 and the plurality of touch sensing columns TSC1 through TSC4, and may include the plurality of touch driving electrodes TX1 through TX8 in each touch driving column TDC1 through TDC5, and the plurality of touch sensing electrodes (e.g., RX1 and RX8) in each touch sensing column (e.g., TSC1). In some example embodiments, the touch sensor 520 may be a one-layer (1-L) touch sensor where the plurality of touch driving electrodes TX1 through TX8 and the plurality of touch sensing electrodes RX1 through RX8 are formed in a single layer. Further, as illustrated in FIG. 1, each touch driving electrode TX1 through TX8 and each touch sensing electrode RX1 through RX8 may have a rectangular shape, but the shape of the touch driving electrodes and touch sensing electrodes is not limited to the rectangular shape. According to an example embodiment, the touch sensor 520 may be an add-on type touch sensor that is attached on the display panel 510, or an embedded type touch sensor formed within or integrated with the display panel 510. For example, the touch sensor 520 may be, but is not limited to, an on-cell type embedded touch sensor, or an in-cell type embedded touch sensor.

The touch controller 540 may detect presence and/or a location of a touch input by the conductive object by driving the touch sensor 520 and sensing a change caused by the touch input. For example, the touch controller 540 may provide touch driving signals TX5 to the plurality of touch driving electrodes TX1 through TX8 through the plurality of touch driving lines TXL1 through TXL8, respectively. Touch sensing signals RX5 may be induced at one or more of the plurality of touch sensing electrodes RX1 through RX8 based on the touch driving signals by capacitive coupling between the plurality of touch driving electrodes TX1 through TX8 and the plurality of touch sensing electrodes RX1 through RX8. The touch controller 540 may receive the touch sensing signals RX5 through the plurality of touch sensing lines RXL1 through RXL8. Further, the touch controller 540 may detect a change of a mutual capacitance between a corresponding touch driving electrode TX1 through TX8 and a corresponding touch sensing electrode RX1 through RX8 caused by the touch input by the conductive object based on the touch sensing signals RX5, thereby detecting the presence and/or location of the touch input in a corresponding one of the touch rows TR1 through TR16 and a corresponding one of the touch columns TC1 through TC8.

FIG. 11 illustrates an example of the touch controller 540 that may include a touch driving circuit 550 for providing the touch driving signals TX5 to the touch sensor 520, and a touch sensing circuit 560 for receiving the touch sensing signals TX5 from the touch sensor 520.

The touch driving circuit 550 may include first through eighth touch driving channels for providing the touch driving signals TX5 to the first through eighth touch driving electrodes TX1 through TX8 through the first through eighth touch driving lines TXL1 through TXL8, respectively. Further, the touch driving circuit 550 may substantially simultaneously drive two or more odd-numbered touch driving electrodes TX1, TX3, TX5, and TX7 during a first touch group driving period, and may substantially simultaneously drive two or more even-numbered touch driving electrodes TX2, TX4, TX6, and TX8 during a second touch group driving period that is different from the first touch group driving period. For example, odd-numbered touch driving channels, or the first, third, fifth, and seventh touch driving channels of the touch driving circuit 550 may substantially simultaneously apply the touch driving signals TX5 to the first, third, fifth, and seventh touch driving electrodes TX1, TX3, TX5, and TX7 through the first, third, fifth, and seventh touch driving lines TXL1, TXL3, TXL5, and TXL7 during the first touch group driving period, and even-numbered touch driving channels, or the second, fourth, sixth, and eighth touch driving channels of the touch driving circuit 550 may substantially simultaneously apply the touch driving signals TX5 to the second, fourth, sixth, and eighth touch driving electrodes TX2, TX4, TX6, and TX8 through the second, fourth, sixth, and eighth touch driving lines TXL2, TXL4, TXL6 and TXL8. Accordingly, the touch sensor 520 may reduce an undesired parasitic capacitance between the touch driving lines TXL1 through TXL8 and the touch sensing lines RXL1 through RXL8 and the touch driving electrodes TX1 through TX8 and the touch sensing electrodes RX1 through RX8, thereby reducing power consumption and a noise of the touch sensor 520 in the touch driving signals and/or the touch sensing signals.

The touch sensing circuit 560 may include the first through eighth touch sensing channels 570 for receiving the touch sensing signals RX5 from the first through eighth touch sensing electrodes RX1 through RX8 through the first through eighth touch sensing lines RXL1 through RXL8, respectively. For example, each touch sensing channel 570 may include, but is not limited to, an amplifier AMP, a capacitor CAP, a switch SW, and an analog-to-digital converter ADC. The touch sensing signal RX5 received by each touch sensing channel 570 may be converted from an analog signal into a digital signal. The touch controller 540 may generate touch data TD representing a detected touch input based on the digital signals that are output from the first through eighth touch sensing channels 570, and may provide the touch data TD to the timing controller and/or the external processor.

As described above, the touch sensor 520 of the display device 500 may drive the odd-numbered touch driving electrodes TX1, TX3, TX5, and TX7 substantially simultaneously, and the even-numbered touch driving electrodes TX2, TX4, TX6, and TX8 substantially simultaneously in different touch group driving periods. Accordingly, the touch sensor 520 may reduce the undesired parasitic capacitance between the touch driving lines TXL1 through TXL8 and the touch sensing lines RXL1 through RXL8 and the touch driving electrodes TX1 through TX8 and the touch sensing electrodes RX1 through RX8, thereby reducing power consumption and a noise in the touch driving signals and/or the touch sensing signals.

Figure 12:
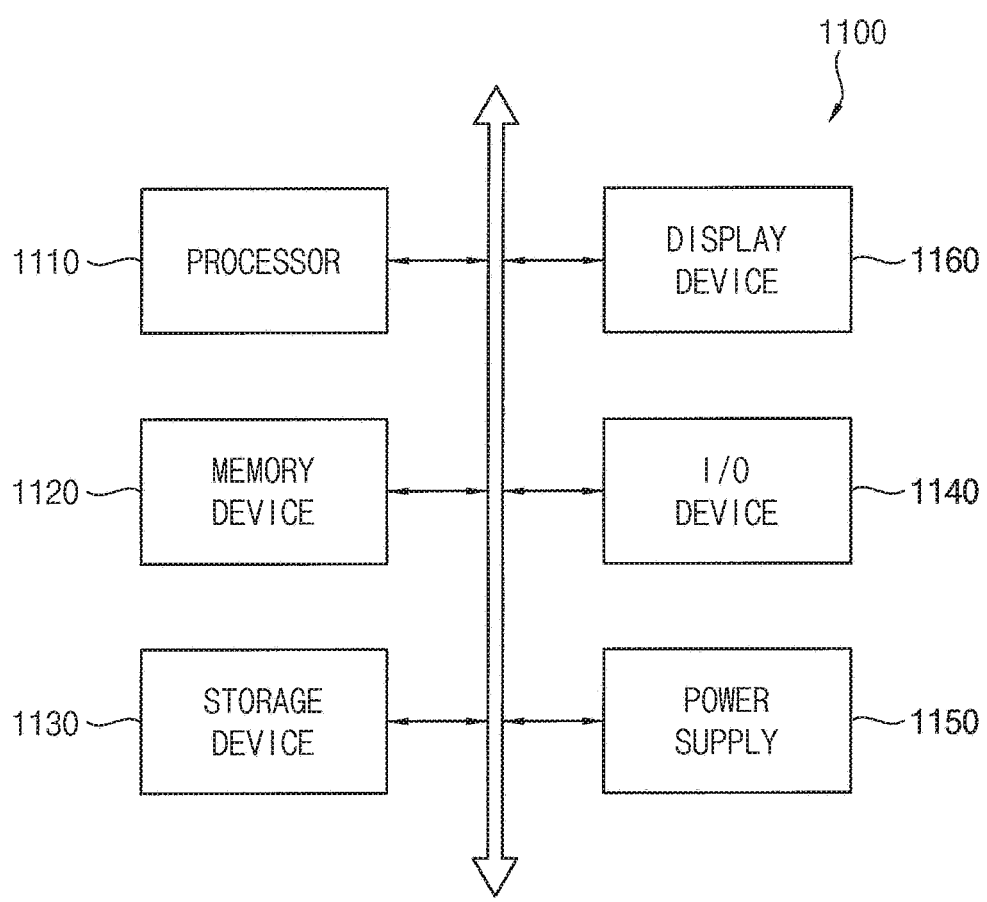
FIG. 12 is an electronic device including a display device according to an example embodiment.

FIG. 12 is an electronic device including a display device according to an example embodiment.

Referring to FIG. 12, an electronic device 1100 may include a processor 1110, a memory device 1120, a storage device 1130, an input/output (I/O) device 1140, a power supply 1150, and a display device 1160. The electronic device 1100 may further include a plurality of ports for communicating with various peripheral components and/or devices such as a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, the processor 1110 may be further coupled to an extended bus such as a peripheral component interconnection (PCI) bus.

The memory device 1120 may store data for operating the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may include an input device such as a keyboard, a keypad, a mouse, a touch screen, etc., and an output device such as a printer, a speaker, etc. The power supply 1150 may supply power for operating the electronic device 1100. The display device 1160 may be coupled to other components through buses or other communication links.

The display device 1160 may include a touch sensor. The touch sensor may drive odd-numbered touch driving electrodes substantially simultaneously, and even-numbered touch driving electrodes substantially simultaneously in different touch group driving periods. Accordingly, the touch sensor may reduce an undesired parasitic capacitance between lines and electrodes of the touch sensor, thereby reducing power consumption and a noise in the touch sensor.

The present inventive concepts may be applied any electronic device 1100 including the display device 1160. For example, the present inventive concepts may be applied to a mobile phone, a smart phone, a tablet computer, a television (TV), a digital TV, a three-dimensional (3D) TV, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of example embodiments and is not to be construed as limiting thereof. Although some example embodiments have been described, those skilled in the art would readily appreciate that modifications and deviations are possible in the example embodiments without materially departing from the novel teachings and advantages of the present inventive concept. Accordingly, such modifications and deviations are intended to be included within the scope of the present inventive concept. Therefore, it is to be understood that the foregoing is illustrative of various example embodiments of the present inventive concepts and is not to be construed as limited to the specific example embodiments disclosed, and that modifications and deviations to the disclosed example embodiments, as well as other example embodiments, are intended to be included within the scope of the present inventive concepts represented by the appended claims.

What is claimed is:

1. A touch sensor comprising:
   a plurality of touch driving electrodes arranged in each of a plurality of touch driving columns in a column direction; and
   a plurality of touch sensing electrodes arranged in each of a plurality of touch sensing columns in the column direction, the plurality of touch driving columns and the plurality of touch sensing columns being alternately arranged in a row direction,
   wherein, in each of the plurality of touch driving columns, two or more odd-numbered touch driving electrodes among the plurality of touch driving electrodes are substantially simultaneously driven during a first touch group driving period, and
   wherein, in each of the plurality of touch driving columns, two or more even-numbered touch driving electrodes among the plurality of touch driving electrodes are substantially simultaneously driven during a second touch group driving period that is different from the first touch group driving period.

2. The touch sensor of claim 1, further comprising:
   a plurality of touch driving lines extending substantially in the column direction and respectively connected to the plurality of touch driving electrodes in each of the plurality of touch driving columns,
   wherein, in each of the plurality of touch driving columns, odd-numbered touch driving lines among the plurality of touch driving lines are connected to the odd-numbered touch driving electrodes at a first side of the plurality of touch driving electrodes, and
   wherein, in each of the plurality of touch driving columns, even-numbered touch driving lines among the plurality of touch driving lines are connected to the even-numbered touch driving electrodes at a second side that is opposite to the first side of the plurality of touch driving electrodes.

3. The touch sensor of claim 2, wherein touch driving signals are substantially simultaneously applied to the odd-numbered touch driving electrodes through the odd-numbered touch driving lines during the first touch group driving period, and the odd-numbered touch driving electrodes are substantially simultaneously driven, and
   wherein the touch driving signals are substantially simultaneously applied to the even-numbered touch driving electrodes through the even-numbered touch driving lines during the second touch group driving period, and the even-numbered touch driving electrodes are substantially simultaneously driven.

4. The touch sensor of claim 1, wherein, in each of the plurality of touch driving columns, the plurality of touch driving electrodes includes first through eighth touch driving electrodes arranged in the column direction,
   wherein the first, third, fifth, and seventh touch driving electrodes among the first through eighth touch driving electrodes are substantially simultaneously driven during the first touch group driving period, and
   wherein the second, fourth, sixth, and eighth touch driving electrodes among the first through eighth touch driving electrodes are substantially simultaneously driven during the second touch group driving period.

5. The touch sensor of claim 4, wherein the first touch group driving period includes first, second, third, and fourth touch group driving sub-periods,
   wherein, in the first touch group driving sub-period, first, third, and fifth touch driving signals having a first edge are applied to the first, third, and fifth touch driving electrodes, and a seventh touch driving signal having a second edge is applied to the seventh touch driving electrode,
   wherein, in the second touch group driving sub-period, the first, third, and seventh touch driving signals having the first edge are applied to the first, third, and seventh touch driving electrodes, and the fifth touch driving signal having the second edge is applied to the fifth touch driving electrode,
   wherein, in the third touch group driving sub-period, the first, fifth, and seventh touch driving signals having the first edge are applied to the first, fifth, and seventh touch driving electrodes, and the third touch driving signal having the second edge is applied to the third touch driving electrode, and
   wherein, in the fourth touch group driving sub-period, the third, fifth, and seventh touch driving signals having the first edge are applied to the third, fifth, and seventh touch driving electrodes, and the first touch driving signal having the second edge is applied to the first touch driving electrode.

6. The touch sensor of claim 4, wherein the second touch group driving period includes fifth, sixth, seventh, and eighth touch group driving sub-periods,
   wherein, in the fifth touch group driving sub-period, second, fourth, and sixth touch driving signals having a first edge are applied to the second, fourth, and sixth touch driving electrodes, and an eighth touch driving signal having a second edge is applied to the eighth touch driving electrode,
   wherein, in the sixth touch group driving sub-period, the second, fourth, and eighth touch driving signals having the first edge are applied to the second, fourth, and eighth touch driving electrodes, and the sixth touch driving signal having the second edge is applied to the sixth touch driving electrode,
   wherein, in the seventh touch group driving sub-period, the second, sixth, and eighth touch driving signals having the first edge are applied to the second, sixth, and eighth touch driving electrodes, and the fourth touch driving signal having the second edge is applied to the fourth touch driving electrode, and
   wherein, in the eighth touch group driving sub-period, the fourth, sixth, and eighth touch driving signals having the first edge are applied to the fourth, sixth, and eighth touch driving electrodes, and the second touch driving signal having the second edge is applied to the second touch driving electrode.

7. The touch sensor of claim 1, further comprising:
a first touch sensing line extending substantially in the column direction and coupled to odd-numbered touch sensing electrodes among the plurality of touch sensing electrodes in each of the plurality of touch sensing columns; and
a second touch sensing line extending substantially in the column direction and coupled to even-numbered touch sensing electrodes among the plurality of touch sensing electrodes in each of the plurality of touch sensing columns.

8. The touch sensor of claim 7, wherein, in each of the plurality of touch sensing columns, the first touch sensing line is located at a first side of the plurality of touch sensing electrodes, and
wherein, in each of the plurality of touch sensing columns, the second touch sensing line is located at a second side opposite to the first side of the plurality of touch sensing electrodes.

9. The touch sensor of claim 1, wherein each of the plurality of touch driving electrodes is located adjacent to two of the plurality of touch sensing electrodes at one side of each of the plurality of touch driving electrodes, each of the plurality of touch driving electrodes is arranged in a (2N−1)-th touch row and a 2N-th touch row, and each of the plurality of touch sensing electrodes is arranged in a (2N−2)-th touch row and the (2N−1)-th touch row, where N is an integer greater than 0.

10. The touch sensor of claim 1, wherein the plurality of touch driving electrodes and the plurality of touch sensing electrodes are located in a same layer.

11. A display device comprising:
a display panel including a plurality of pixels;
a touch sensor disposed on the plurality of pixels;
a display driver configured to drive the plurality of pixels; and
a touch controller configured to drive the touch sensor,
wherein the touch sensor includes:
a plurality of touch driving electrodes arranged in each of a plurality of touch driving columns in a column direction; and
a plurality of touch sensing electrodes arranged in each of a plurality of touch sensing columns in the column direction, the plurality of touch driving columns and the plurality of touch sensing columns being alternately arranged in a row direction, and
wherein the touch controller is configured to:
substantially simultaneously drive two or more odd-numbered touch driving electrodes among the plurality of touch driving electrodes in each of the plurality of touch driving columns during a first touch group driving period; and
substantially simultaneously drive two or more even-numbered touch driving electrodes among the plurality of touch driving electrodes in each of the plurality of touch driving columns during a second touch group driving period that is different from the first touch group driving period.

12. The display device of claim 11, wherein the touch sensor further includes:
a plurality of touch driving lines extending substantially in the column direction and respectively connected to the plurality of touch driving electrodes in each of the plurality of touch driving columns,
wherein, in each of the plurality of touch driving columns, odd-numbered touch driving lines among the plurality of touch driving lines are connected to the odd-numbered touch driving electrodes at a first side of the plurality of touch driving electrodes, and
wherein, in each of the plurality of touch driving columns, even-numbered touch driving lines among the plurality of touch driving lines are connected to the even-numbered touch driving electrodes at a second side that is opposite to the first side of the plurality of touch driving electrodes.

13. The display device of claim 12, wherein the touch controller substantially simultaneously applies touch driving signals to the odd-numbered touch driving electrodes through the odd-numbered touch driving lines during the first touch group driving period and drives the odd-numbered touch driving electrodes substantially simultaneously, and
wherein the touch controller substantially simultaneously applies the touch driving signals to the even-numbered touch driving electrodes through the even-numbered touch driving lines during the second touch group driving period and drives the even-numbered touch driving electrodes substantially simultaneously.

14. The display device of claim 11, wherein, in each of the plurality of touch driving columns, the plurality of touch driving electrodes includes first through eighth touch driving electrodes arranged in the column direction,
wherein the touch controller substantially simultaneously drives the first, third, fifth, and seventh touch driving electrodes among the first through eighth touch driving electrodes during the first touch group driving period, and
wherein the touch controller substantially simultaneously drives the second, fourth, sixth, and eighth touch driving electrodes among the first through eighth touch driving electrodes during the second touch group driving period.

15. The display device of claim 14, wherein the first touch group driving period includes first, second, third, and fourth touch group driving sub-periods,
wherein, in the first touch group driving sub-period, the touch controller applies first, third, and fifth touch driving signals having a first edge to the first, third, and fifth touch driving electrodes, and applies a seventh touch driving signal having a second edge to the seventh touch driving electrode,
wherein, in the second touch group driving sub-period, the touch controller applies the first, third, and seventh touch driving signals having the first edge to the first, third, and seventh touch driving electrodes, and applies the fifth touch driving signal having the second edge to the fifth touch driving electrode,
wherein, in the third touch group driving sub-period, the touch controller applies the first, fifth, and seventh touch driving signals having the first edge to the first, fifth, and seventh touch driving electrodes, and applies the third touch driving signal having the second edge to the third touch driving electrode, and
wherein, in the fourth touch group driving sub-period, the touch controller applies the third, fifth, and seventh touch driving signals having the first edge to the third, fifth, and seventh touch driving electrodes, and applies the first touch driving signal having the second edge to the first touch driving electrode.

16. The display device of claim 14, wherein the second touch group driving period includes fifth, sixth, seventh, and eighth touch group driving sub-periods,
wherein, in the fifth touch group driving sub-period, the touch controller applies second, fourth, and sixth touch driving signals having a first edge to the second, fourth, and sixth touch driving electrodes, and applies an eighth touch driving signal having a second edge to the eighth touch driving electrode, wherein, in the sixth touch group driving sub-period, the touch controller applies the second, fourth, and eighth touch driving signals having the first edge to the second, fourth, and eighth touch driving electrodes, and applies the sixth touch driving signal having the second edge to the sixth touch driving electrode, wherein, in the seventh touch group driving sub-period, the touch controller applies the second, sixth, and eighth touch driving signals having the first edge to the second, sixth, and eighth touch driving electrodes, and applies the fourth touch driving signal having the second edge to the fourth touch driving electrode, and wherein, in the eighth touch group driving sub-period, the touch controller applies the fourth, sixth, and eighth touch driving signals having the first edge to the fourth, sixth, and eighth touch driving electrodes, and applies the second touch driving signal having the second edge to the second touch driving electrode.

17. A method of driving a touch sensor that includes a plurality of touch driving electrodes arranged in each of a plurality of touch driving columns in a column direction, and a plurality of touch sensing electrodes arranged in each of a plurality of touch sensing columns in the column direction, the plurality of touch driving columns and the plurality of touch sensing columns being alternately arranged in a row direction, the method comprising:

substantially simultaneously driving two or more odd-numbered touch driving electrodes among the plurality of touch driving electrodes in each of the plurality of touch driving columns during a first touch group driving period; and substantially simultaneously driving two or more even-numbered touch driving electrodes among the plurality of touch driving electrodes in each of the plurality of touch driving columns during a second touch group driving period that is different from the first touch group driving period.

18. The method of claim 17, wherein the touch sensor further includes a plurality of touch driving lines extending substantially in the column direction and respectively connected to the plurality of touch driving electrodes in each of the plurality of touch driving columns, wherein substantially simultaneously driving the odd-numbered touch driving electrodes includes:
substantially simultaneously applying touch driving signals to the odd-numbered touch driving electrodes through odd-numbered touch driving lines among the plurality of touch driving lines during the first touch group driving period, the odd-numbered touch driving lines being connected to the odd-numbered touch driving electrodes at a first side of the plurality of touch driving electrodes in each of the plurality of touch driving columns, and wherein substantially simultaneously driving the even-numbered touch driving electrodes includes:
substantially simultaneously applying the touch driving signals to the even-numbered touch driving electrodes through even-numbered touch driving lines among the plurality of touch driving lines during the second touch group driving period, the even-numbered touch driving lines being connected to the even-numbered touch driving electrodes at a second side that is opposite to the first side of the plurality of touch driving electrodes in each of the plurality of touch driving columns.

19. The method of claim 17, wherein the plurality of touch driving electrodes includes first through eighth touch driving electrodes arranged in the column direction, and the first touch group driving period includes first, second, third, and fourth touch group driving sub-periods, and wherein substantially simultaneously driving the odd-numbered touch driving electrodes includes:
applying first, third, and fifth touch driving signals having a first edge to the first, third, and fifth touch driving electrodes and a seventh touch driving signal having a second edge to the seventh touch driving electrode in the first touch group driving sub-period;

applying the first, third, and seventh touch driving signals having the first edge to the first, third, and seventh touch driving electrodes and the fifth touch driving signal having the second edge to the fifth touch driving electrode in the second touch group driving sub-period;

applying the first, fifth, and seventh touch driving signals having the first edge to the first, fifth, and seventh touch driving electrodes and the third touch driving signal having the second edge to the third touch driving electrode in the third touch group driving sub-period; and applying the third, fifth, and seventh touch driving signals having the first edge to the third, fifth, and seventh touch driving electrodes and the first touch driving signal having the second edge to the first touch driving electrode in the fourth touch group driving sub-period.

20. The method of claim 17, wherein the plurality of touch driving electrodes includes first through eighth touch driving electrodes arranged in the column direction, and the second touch group driving period includes fifth, sixth, seventh, and eighth touch group driving sub-periods, and wherein substantially simultaneously driving the even-numbered touch driving electrodes includes:
applying second, fourth, and sixth touch driving signals having a first edge to the second, fourth, and sixth touch driving electrodes and an eighth touch driving signal having a second edge to the eighth touch driving electrode in the fifth touch group driving sub-period;

applying the second, fourth, and eighth touch driving signals having the first edge to the second, fourth, and eighth touch driving electrodes and the sixth touch driving signal having the second edge to the sixth touch driving electrode in the sixth touch group driving sub-period;

applying the second, sixth, and eighth touch driving signals having the first edge to the second, sixth, and eighth touch driving electrodes and the fourth touch driving signal having the second edge to the fourth touch driving electrode in the seventh touch group driving sub-period; and applying the fourth, sixth, and eighth touch driving signals having the first edge to the fourth, sixth, and eighth touch driving electrodes and the second touch driving signal having the second edge to the second touch driving electrode in the eighth touch group driving sub-period.

* * * * *